US011872807B2

(12) United States Patent
Miyase et al.

(10) Patent No.: US 11,872,807 B2
(45) Date of Patent: Jan. 16, 2024

(54) IMAGE RECORDING APPARATUS

(71) Applicant: BROTHER KOGYO KABUSHIKI KAISHA, Nagoya (JP)

(72) Inventors: Satoshi Miyase, Nagoya (JP); Masao Mimoto, Kitanagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 481 days.

(21) Appl. No.: 17/206,853

(22) Filed: Mar. 19, 2021

(65) Prior Publication Data

US 2021/0300076 A1 Sep. 30, 2021

(30) Foreign Application Priority Data

Mar. 31, 2020 (JP) ................................ 2020-064255
Mar. 31, 2020 (JP) ................................ 2020-064263

(51) Int. Cl.
*B41J 11/04* (2006.01)
*B41J 29/02* (2006.01)

(52) U.S. Cl.
CPC ............... *B41J 11/04* (2013.01); *B41J 29/02* (2013.01)

(58) Field of Classification Search
CPC ................................. B41J 11/04; B41J 29/02
See application file for complete search history.

(56) References Cited

U.S. PATENT DOCUMENTS 8,876,420 B2 * 11/2014 Iijima .................... B41J 11/006 400/188
9,016,463 B2 * 4/2015 Mimoto ................. B65H 5/062 271/274
9,187,283 B2 * 11/2015 Sano .................... B65H 29/125
9,517,645 B2 * 12/2016 Iijima .................... B41J 13/009
9,783,381 B2 * 10/2017 Kawamata ............. B65H 5/062

FOREIGN PATENT DOCUMENTS

JP 2015-66934 A 4/2015

* cited by examiner

*Primary Examiner* — Howard J Sanders
(74) *Attorney, Agent, or Firm* — Scully, Scott, Murphy & Presser, PC

(57) ABSTRACT

A roller pair includes lower and upper rollers that contact each other at a conveyance path. A platen is located downstream of the roller pair in the conveyance path, and has an end facing toward a surface. A recording head faces the platen from above and ejects ink to a sheet. A movement mechanism moves the platen and the lower roller in conjunction with movement of a tray in a drawing direction such that: the end of the platen moves from a first support position at which the platen supports a sheet to a first lower position at which the platen is separated farther downward from the recording head than at the first support position; and the lower roller moves from a contact position at which the lower roller contacts the upper roller to a second lower position at which the lower roller is separated downward from the upper roller.

17 Claims, 14 Drawing Sheets

IMAGE RECORDING APPARATUS

CROSS REFERENCE TO RELATED APPLICATIONS

This application claims priority from Japanese Patent Application Nos. 2020-064255 and 2020-064263 both filed Mar. 31, 2020. The entire content of each of the priority applications is incorporated herein by reference.

TECHNICAL FIELD

This disclosure relates to an image recording apparatus.

BACKGROUND

In a known image recording apparatus, a conveyance roller pair includes rollers located in contact with each other in the vertical direction. At the time of image recording, the conveyance roller pair nips a sheet fed from a supply tray to a first conveyance path and rotates to feed the sheet forward. A platen is provided forward of the conveyance roller pair and supports a sheet. A recording head records an image on a sheet on the platen. At the time of image recording, the platen is located at a reference position at which the platen is located below and faces the recording head with a gap.

Further, the image recording apparatus is provided with a second conveyance path below the platen for guiding the sheet having the image recorded on one side to the above-mentioned first conveyance path in order to record an image on the other side of the sheet.

SUMMARY

According to one aspect of the disclosure, an image recording apparatus includes a housing, a cover, a tray, a roller pair, a platen, a recording head, and a movement mechanism. The housing includes a first surface having a first opening, a second surface having a second opening, and a first conveyance path. The cover is provided at the second surface and is movable between a closed position at which the second opening is closed and an open position at which the second opening is opened. The tray is configured to support a sheet and is movable through the first opening in a mounting direction toward a mount position in the housing and a drawing direction opposite the mounting direction. The roller pair is located above the tray at the mount position. The roller pair includes a lower roller and an upper roller located in contact with each other at the first conveyance path. The platen is located downstream of the roller pair in the first conveyance path. The platen has an end facing the second surface. The recording head faces the platen from above and is configured to eject ink to a sheet supported by the platen. The movement mechanism is configured to move the platen and the lower roller in conjunction with movement of the tray in the drawing direction such that: the end of the platen moves from a first support position at which the platen supports a sheet to a first lower position at which the platen is separated farther downward from the recording head than at the first support position; and the lower roller moves from a contact position at which the lower roller contacts the upper roller to a second lower position at which the lower roller is separated downward from the upper roller.

According to the image recording apparatus, for example, a user can access the first conveyance path through the second opening. Further, a sheet jammed on and around the platen can be removed easily, and the height of the image recording apparatus can be reduced.

BRIEF DESCRIPTION OF THE DRAWINGS

Embodiments in accordance with this disclosure will be described in detail with reference to the following figures wherein:

FIGS. 1A and 1B show a front side and a rear side of the MFP, respectively;

FIGS. 11A and 11B are schematic views showing a state of the printer unit 30 in a mounting process and a drawing process of the supply tray 31, in which FIG. 11A shows a state in which the supply tray 31 is not in an internal space 22 and FIG. 11B shows a state in which the supply tray 31 is in contact with a feed arm 332;

FIGS. 12A and 12B are schematic views showing a state of the printer unit 30 in the mounting process and the drawing process of the supply tray 31, in which FIG. 12A shows a state where a cam follower 335 moves relative to an extension end surface 313A on an extension end surface 313A and FIG. 12B shows a state where a protrusion 313F is in contact with the release lever 53;

FIGS. 13A and 13B are schematic views showing a state of the printer unit 30 in the mounting process and the drawing process of the supply tray 31, in which FIG. 13A shows a state where the extending end portion of the release lever 53 moves to a position forward of a rear surface 313P of the protrusion 313F, and FIG. 13B shows a state where the supply tray 31 is started to be pulled out forward from the mount position P2.

DETAILED DESCRIPTION

In the above-described known image recording apparatus, when a jam occurs on or around the platen, the user removes the supply tray from the housing, puts his or her hand in the accommodation space, and operates the lock lever provided in the housing. The accommodation space is a space in which the supply tray is accommodated in the housing, and has an opening that is open toward the front. In response to an operation of the lock lever, the platen rotationally moves about the rotation axis of the lower roller and moves to an open position farther from the recording head than at the reference position. After that, the user can clear the jam.

In the known image recording apparatus, since the platen is away from the front surface of the housing, the user puts his or her hand through the opening of the housing to the inside for clearing a jam.

In view of the foregoing, an aspect of an object of this disclosure is to provide an image recording apparatus in which a jam around a platen can be cleared easily.

Hereinafter, embodiments of this disclosure will be described with reference to the drawings as appropriate. The embodiments described below are merely examples of this disclosure, and the embodiments may be appropriately changed without departing from the claims. In the following description, a vertical direction is defined with reference to the state in which a multifunction peripheral (MFP) 10 is placed such that the MFP 10 is usable (the state shown in FIGS. 1A and 1B), a front-rear direction is defined assuming that a surface formed with a first opening 21A is the front side (front surface 20A), and a left-right direction is defined when the MFP 10 is viewed from the front side (the front surface 20A side). The vertical direction, the front-rear direction, and the left-right direction are perpendicular to each other.

[Overall Configuration of MFP 10 and Printer Unit 30]

Figure 1A:
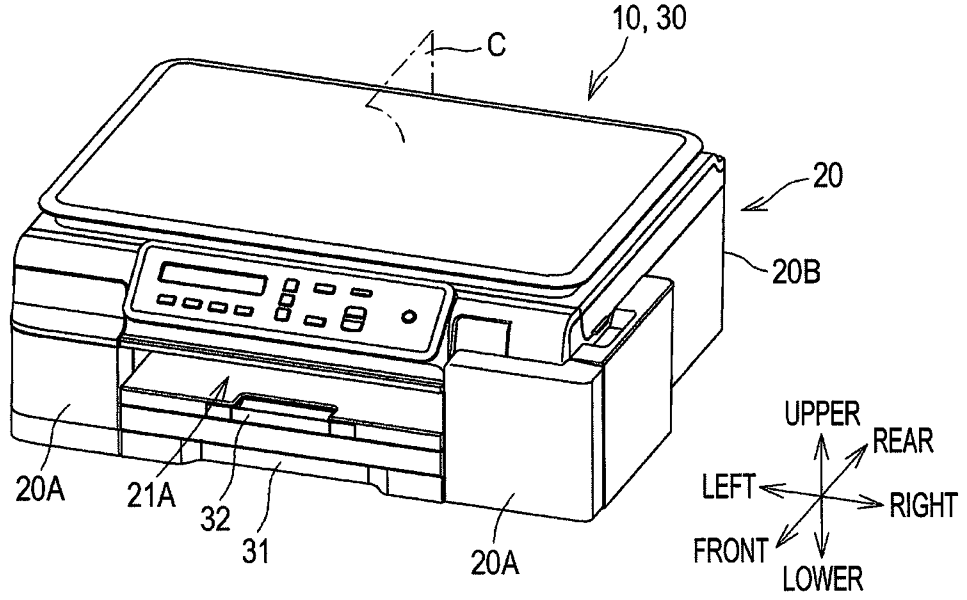
FIGS. 1A and 1B are perspective views showing an external configuration of a multifunction peripheral (MFP) 10.
Figure 1B:
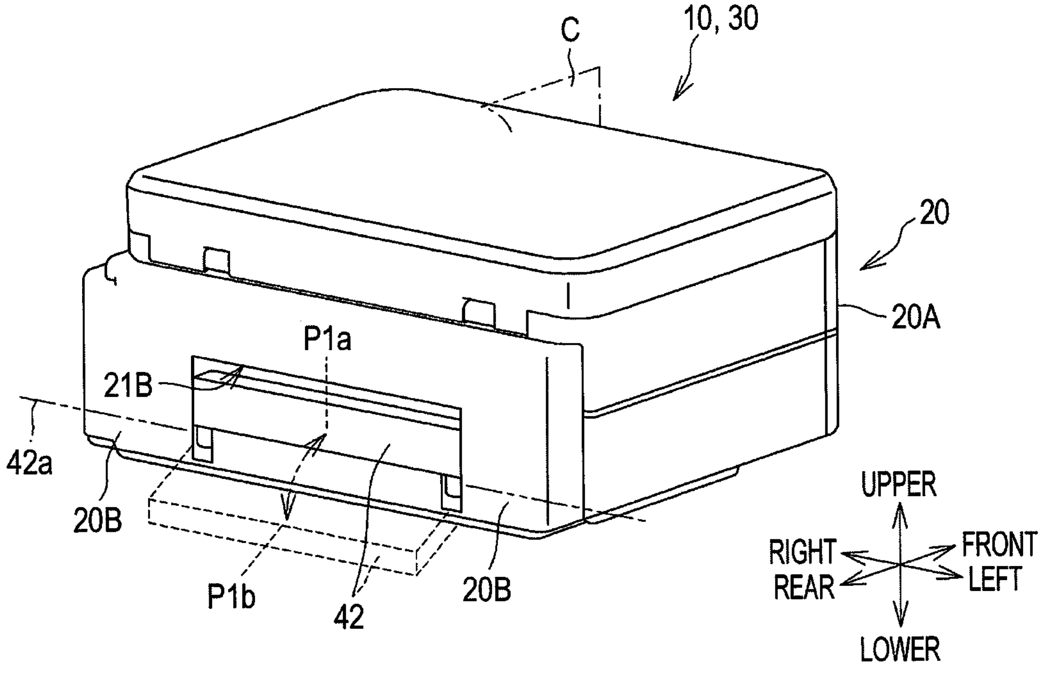

In FIGS. 1A and 1B, the MFP 10 is an example of an image recording apparatus, and has a plurality of functions such as a print function and a scan function.

The MFP 10 has a substantially rectangular parallelepiped and low-profile (low-height) housing 20. The MFP 10 has a printer unit 30 (see FIG. 2 and thereafter) in the housing 20 to realize a printing function. The MFP 10 has a scanner unit in the upper part of the housing 20 to realize a scanning function. Since the scanner unit is not the main part of this disclosure, its description will be omitted.

Figure 2:
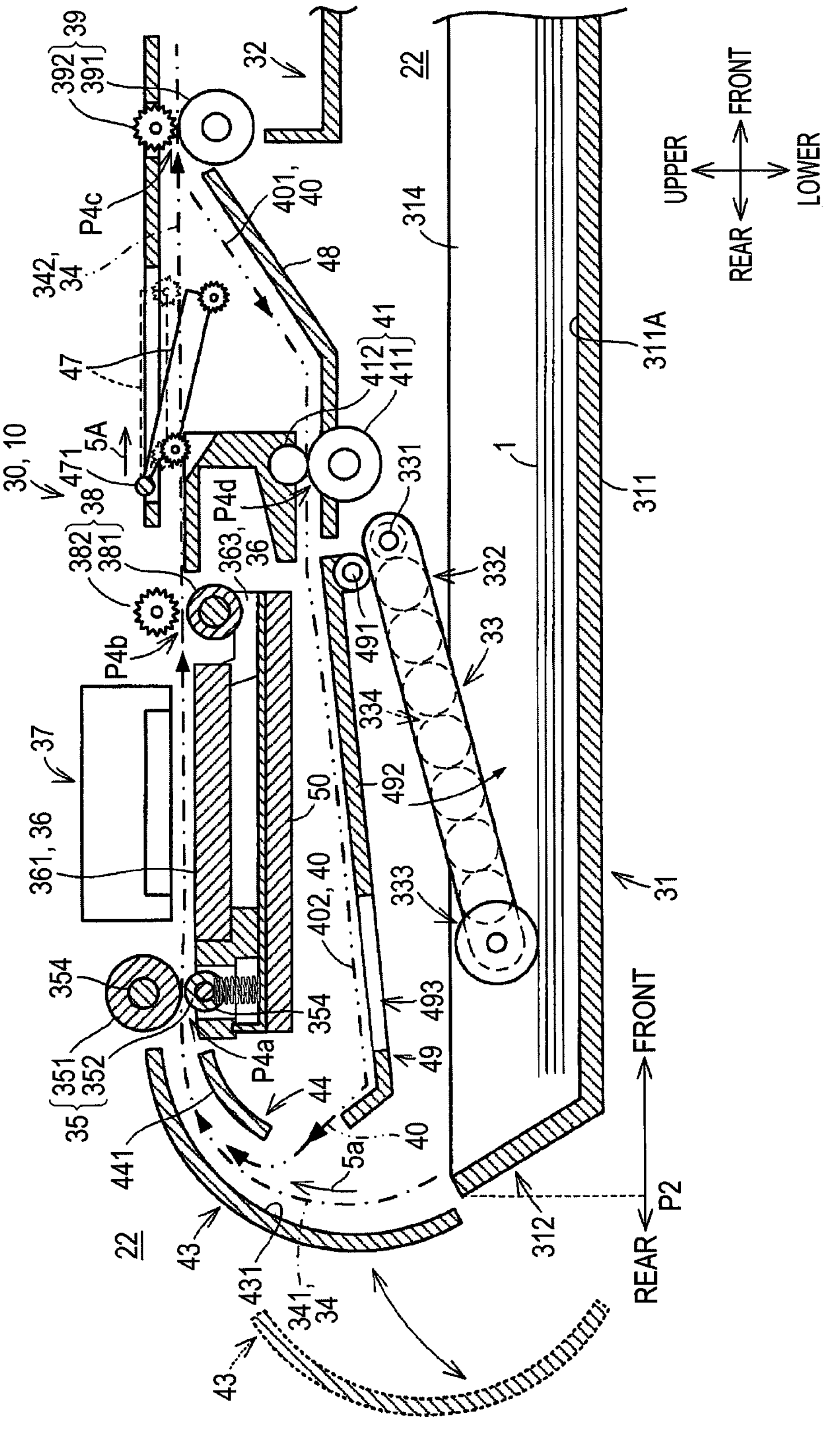
FIG. 2 is a schematic view showing a vertical cross section of a printer unit 30 along a sheet passage center plane C in FIGS. 1A and 1B.

As shown in FIG. 2, the printer unit 30 records an image on both sides of a sheet 1 by an inkjet method. The sheet 1 may be a sheet of paper, an OHP transparency, and other material. The printer unit 30 generally includes a supply tray 31, a discharge tray 32, a feed mechanism 33, a first conveyance path 34, a first roller pair 35, a platen 36, a recording head 37, a second roller pair 38, a third roller pair 39, a second conveyance path 40, a fourth roller pair 41, a flap 47, a fixed lower guide member 48, a movable lower guide member 49, and a movable upper guide member 50. As shown in FIG. 1B, the printer unit 30 includes a cover 42. Each component will be described in detail below.

[Case 20, Cover 42]

As shown in FIGS. 1A and 1B, the housing 20 is an exterior body, and defines an internal space 22 (see FIG. 2) of the housing 20 relative to the external space of the housing 20. The housing 20 is attached to frames of the MFP 10. The frames include a left side frame 23 and a right side frame 24 shown in FIGS. 5 to 8. The left side frame 23 and the right side frame 24 are made of metal, are separated from each other in the left-right direction in the internal space 22, and extend in the vertical direction and the front-rear direction. Each component of the printer unit 30 (see FIG. 2) is located between the left side frame 23 and the right side frame 24 (see FIGS. 5 to 8).

Figure 9:
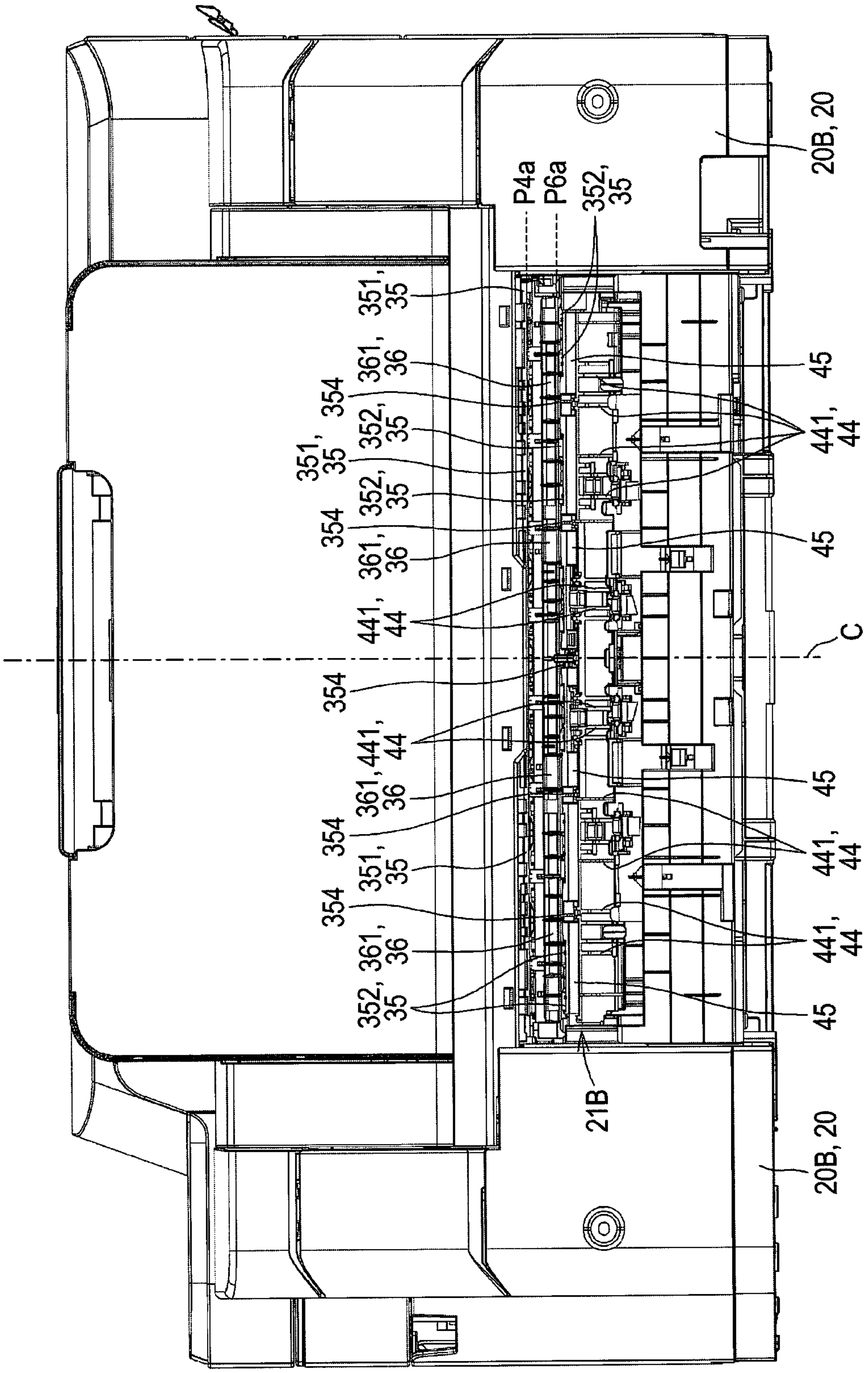
FIG. 9 is a rear view of the printer unit 30 when the platen 36 is at the separation position P7*b* in FIG. 4A.
Figure 10:
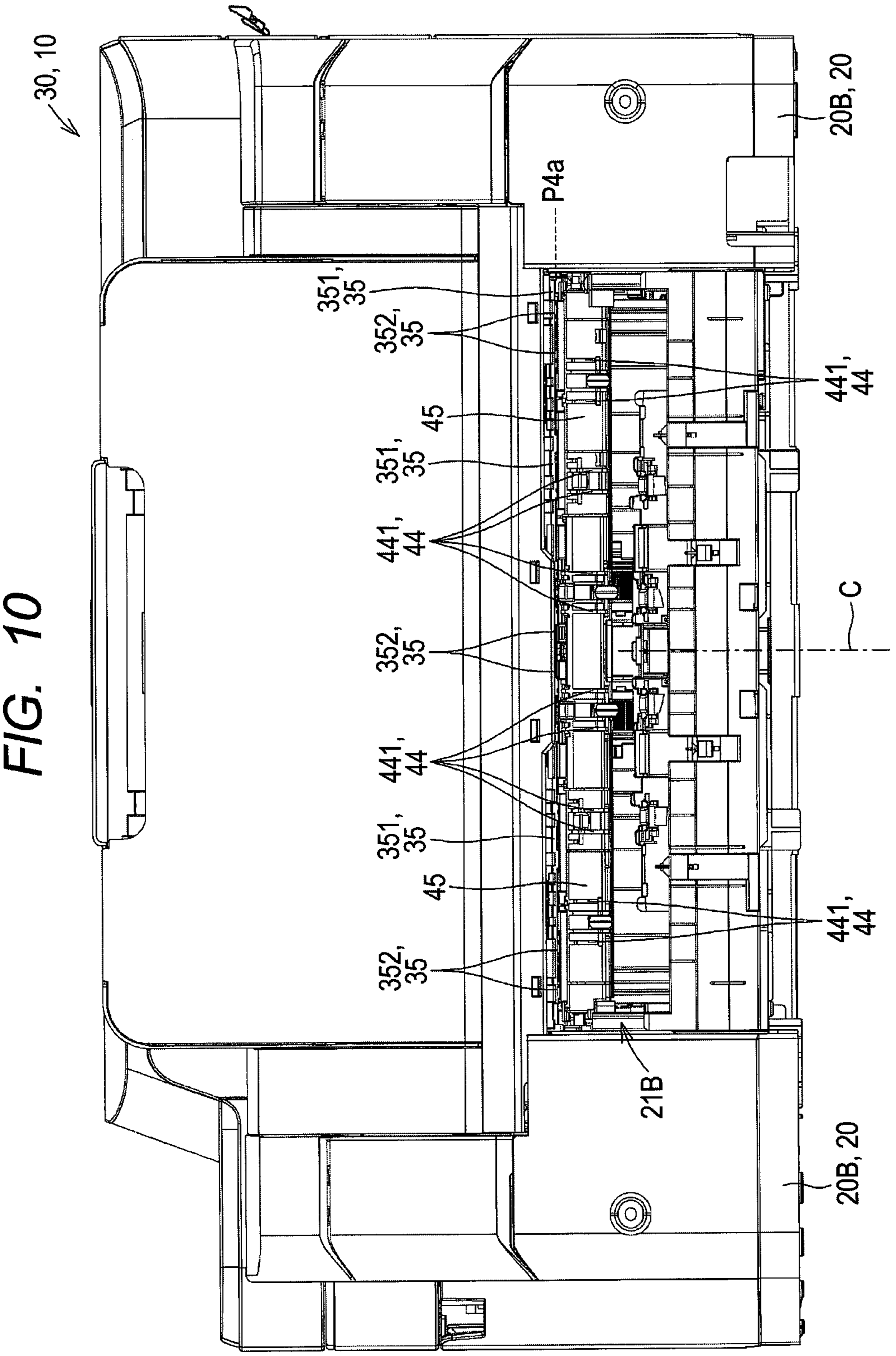
FIG. 10 is a rear view of the printer unit 30 when the platen 36 is at a sheet support position P7*a* in FIG. 3A.

The housing 20 has a front surface 20A and a rear surface 20B. The rear surface 20B is separated rearward from the front surface 20A. A first opening 21A is formed in the front surface 20A, and a second opening 21B is formed in the rear surface 20B. As shown in FIG. 1A, the first opening 21A is open forward at a center portion in the left-right direction in the front surface 20A. As shown in FIGS. 1B, 9, and 10, the second opening 21B has a rectangular shape extending in the left-right direction. The second opening 21B is open rearward at a center portion in the left-right direction and at a lower position in the rear surface 20B.

The internal space 22 (see FIG. 2) of the housing 20 communicates with the external space through the first opening 21A and the second opening 21B.

In FIG. 1B, the cover 42 has a rectangular shape extending in the left-right direction. The cover 42 is supported by the rear surface 20B so as to rotationally move between a closed position P1*a* and an open position P1*b* about an axis 42*a*. The closed position P1*a* and the open position P1*b* are the positions of the cover 42 that closes and opens the second opening 21B, respectively. The closed position P1*a* and the open position P1*b* of the cover 42 are shown by the solid lines and the broken lines, respectively. The axis 42*a* is parallel to the left-right direction and crosses the lower end of the cover 42.

[Supply Tray 31]

Figure 3A:
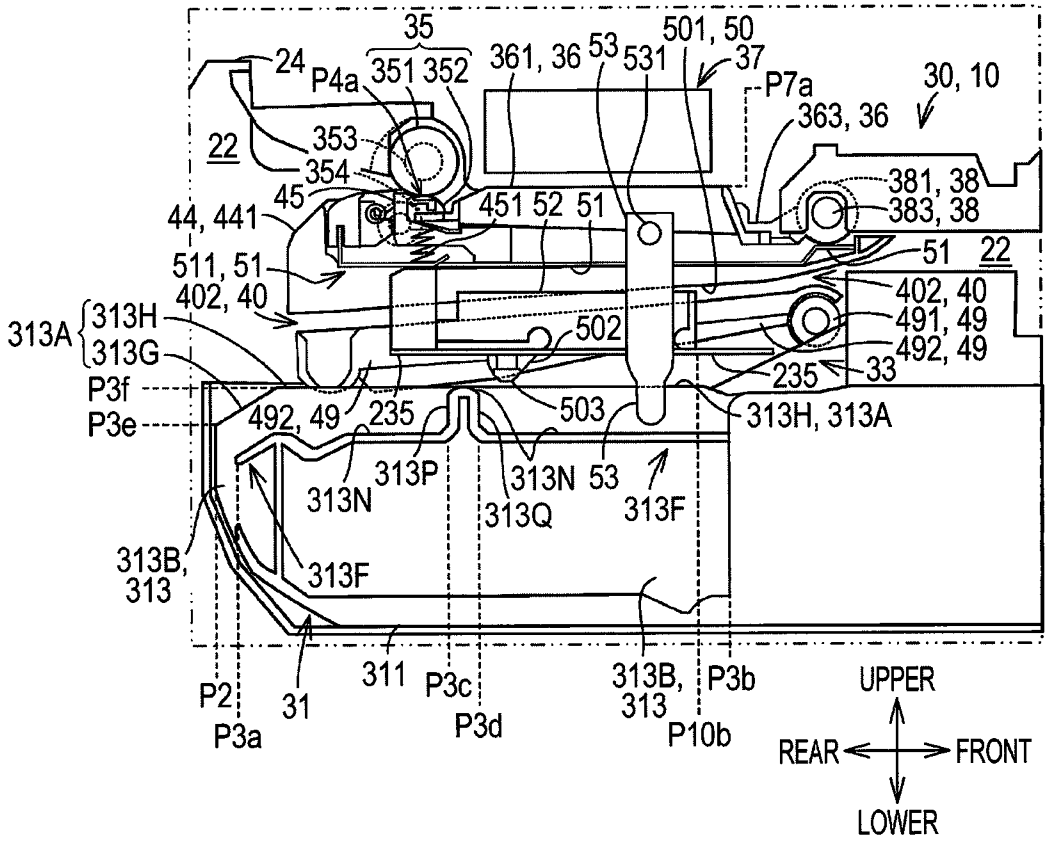
FIG. 3A is a schematic view of the printer unit 30 when a supply tray 31 is at a mount position P2 when viewed from the left.
Figure 3B:
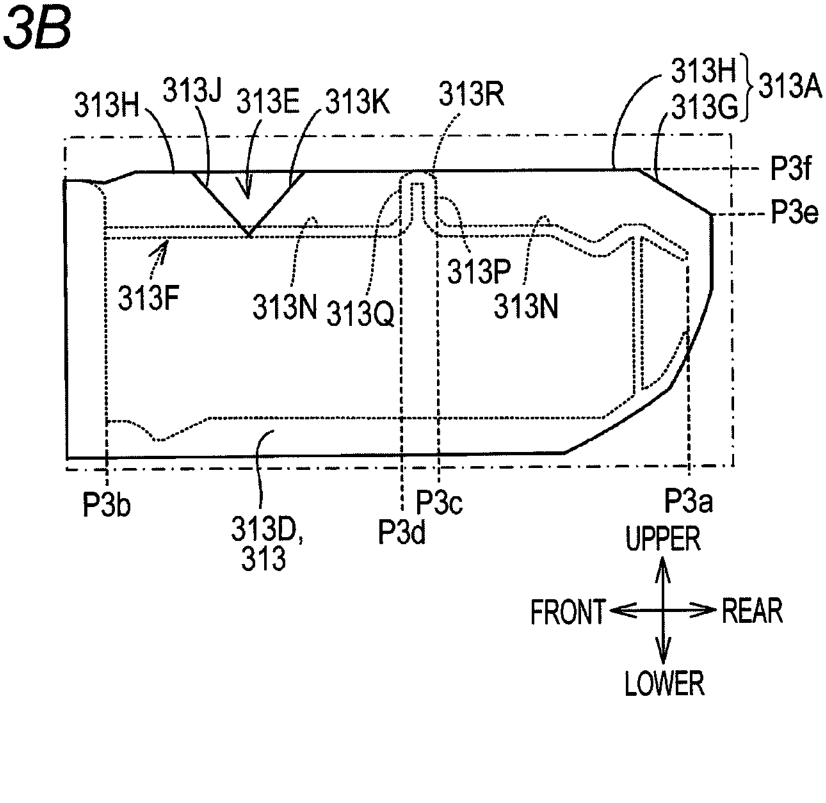
FIG. 3B is a schematic view of a left side wall 313 when viewed from the right.

In FIG. 1A, the supply tray 31 (an example of a tray) is movable in the front-rear direction in the internal space 22 (see FIG. 2) through the first opening 21A. Specifically, as shown in FIGS. 2, 3A, and 3B, during a mounting process, the supply tray 31 moves rearward (an example of a mounting direction) in the internal space 22 and is located at a mount position P2. In a drawing process, the supply tray 31 moves forward (an example of a drawing direction) from the mount position P2 in the internal space 22 and is pulled out from the housing 20 through the first opening 21A (see FIG. 1A, see FIG. 4A). The mount position P2 is the rear end position of the supply tray 31 in the printer unit 30 in a state where an image can be recorded. In the following description, unless otherwise specified, the term "supply tray 31" means "supply tray 31 located at the mount position P2".

As shown in FIGS. 2, 3A, and 3B, the supply tray 31 has a box-like shape that is thin in the vertical direction. The supply tray 31 has a bottom portion 311, a plurality of sheet guides 312, a left side wall 313, and a right side wall 314. The sheet guide 312 and the right side wall 314 are shown in FIG. 2, and the left side wall 313 is shown in FIGS. 3A and 3B.

The left side wall 313, a protrusion 313F, an inclined surface 313G, a horizontal surface 31311, and a concave portion 313E are part of a movement mechanism.

In FIG. 2, the bottom portion 311 supports a plurality of sheets 1 stacked in the vertical direction on an upper surface 311A (an example of a support surface). The sheets 1 are positioned by side guides provided on the bottom portion 311 such that the centers of the sheets 1 in the width direction are aligned with the sheet passage center plane C (see FIG. 1). The sheet passage center plane C is an imaginary plane that passes approximately through the center of the first conveyance path 34 and the second conveyance path 40 in the left-right direction and is parallel to the vertical direction and the front-rear direction. Unless otherwise noted in the following description, the term "symmetrical" means "left-right symmetrical with respect to the sheet passage center plane C".

Each sheet guide 312 extends rearward and upward from the rear end of the bottom portion 311. Each sheet guide 312 has an inclined surface that faces forward and upward and is parallel to the left-right direction.

As shown in FIGS. 3A and 3B, the left side wall 313 (an example of a side wall) extends upward from the left end of the upper surface of the bottom portion 311. The left side wall 313 has an extending end surface 313A, a left side surface (outer surface) 313B, a right side surface (inner surface) 313D, the concave portion 313E and a protrusion 313F. The left side surface 313B is shown in FIG. 3A, and the right side surface 313D and the concave portion 313E are shown in FIG. 3B.

The extending end surface 313A connects the upper ends of the left side surface 313B and the right side surface 313D, and has an elongated shape in the front-rear direction. The extending end surface 313A includes the inclined surface 313G and the horizontal surface 313H. The inclined surface 313G connects the horizontal surface 313H located above the inclined surface 313G with the upper end of the rear end surface of the left side wall 313. The inclined surface 313G extends forward and upward, and is parallel to the left-right direction. The horizontal surface 313H extends forward from the front end of the inclined surface 313G, and is parallel to the front-rear direction and the left-right direction.

In FIG. 3B, the concave portion 313E has a front inclined surface 313J and a rear inclined surface 313K, and defines a space open rightward and upward. The concave portion 313E forms a space that is recessed downward from the horizontal surface 313H and recessed leftward from the right side surface 313D.

The inclined surface 313G and the horizontal surface 313H are cam surfaces that cause a protrusion 503 to move up and down, which will be described later. The inclined surface 313G, the horizontal surface 313H, and the concave portion 313E are cam surfaces that cause a cam follower 335 (see FIG. 4A) to move up and down.

In FIG. 3A, the protrusion 313F protrudes to the left from the left side surface 313B and extends in the front-rear direction between front-rear positions P3*a* and P3*b*. The front-rear position P3*a* indicates the position of the rear end of the protrusion 313F in the front-rear direction, and is a position slightly forward of the rear end of the left side surface 313B. The front-rear position P3*b* indicates the position of the front end of the protrusion 313F in the front-rear direction, and is a position forward of the concave portion 313E as shown in FIG. 3B.

The vertical position of an upper surface 313N of the protrusion 313F is lower than the inclined surface 313G in a range between the front-rear positions P3*a* and P3*b* except between front-rear positions P3*c* and P3*d*, and is approximately the same as the horizontal surface 313H between the front-rear positions P3*c* and P3*d*. However, the upper surface 313N is not limited to this shape. The upper surface 313N may have any other shape that enables the portion between the front-rear positions P3*c* and P3*d* to be above the other portions.

The protrusion 313F has a protruding portion 313R (an example of a protruding portion) that protrudes upward. The protruding portion 313R has a rear surface 313P and a front surface 313Q. The rear surface 313P and the front surface 313Q are flat surfaces parallel to the vertical direction and the left-right direction. The rear surface 313P is located at the front-rear position P3*c* in the front-rear direction, and is located between a vertical position P3*e* indicating the rear end position of the inclined surface 313G in the vertical direction and a vertical position P3*f* indicating the position of the horizontal surface 313H in the vertical direction. The front surface 313Q is located at the front-rear position P3*d* in the front-rear direction, and is located between the vertical positions P3*e* and P3*f*.

The portion of the left wall 313 forward of the protrusion 313F is not the main part, and thus a detailed description thereof will be omitted.

The right side wall 314 (see FIG. 2) has a symmetrical shape with the left side wall 313, except that the right side wall 314 does not have the concave portion 313E. Thus, the illustration and description of the configuration of the right side wall 314 will be omitted.

[Discharge Tray 32]

In FIG. 2, the discharge tray 32 extends forward from a position immediately below the third roller pair 39 in the internal space 22. The discharge tray 32 supports the sheet 1 discharged by the third roller pair 39 on its upper surface.

[Feed Mechanism 33, Cam Follower 335]

Figure 4A:
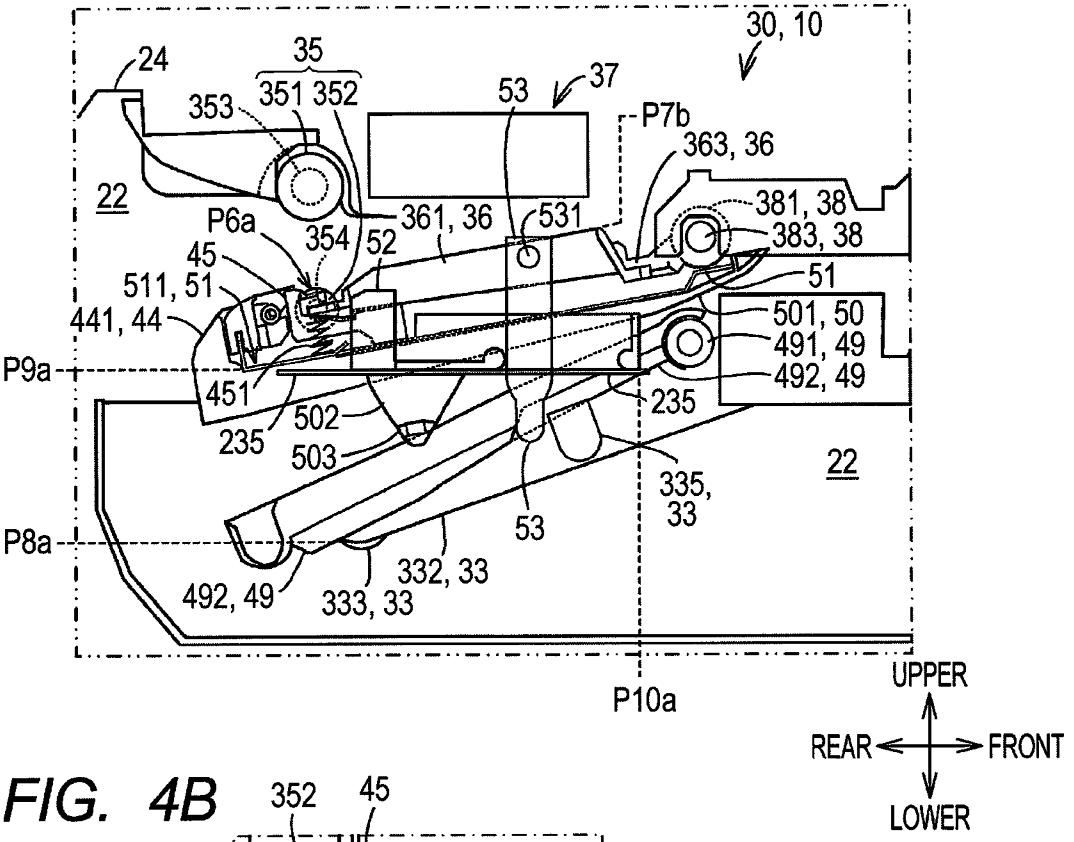
FIG. 4A is a schematic view of the printer unit 30 when the supply tray 31 is pulled out when viewed from the left.

As shown in FIGS. 2 and 4A, the feed mechanism 33 includes a feed shaft 331, a feed arm 332, a feed roller 333, a driving force transmission mechanism 334, and the cam follower 335.

In FIG. 2, the feed shaft 331 is located between the upper end of the supply tray 31 and a shaft 491 of the movable lower guide member 49 in the vertical direction and between the shaft 491 and a roller 411 in the front-rear direction. The feed shaft 331 extends in the left-right direction. The left end of the feed shaft 331 is supported by a left bracket 336 (see FIGS. 11A and 11B). The left bracket 336 is attached to the left side frame 23 (see FIG. 5). The right end of the feed shaft 331 is supported by a right bracket that is symmetrical with the left bracket 336. The right bracket is attached to the right side frame 24 (see FIG. 5). Alternatively, the feed shaft 331 may extend directly from the left side frame 23 and the right side frame 24.

The feed arm 332 is located between the right side wall 314 (see FIG. 2) and the left side wall 313 (see FIGS. 3A and 3B) in the left-right direction. The feed arm 332 is supported by the feed shaft 331 at its base end so as to rotationally move in the circumferential direction of the feed shaft 331. The feed arm 332 extends in a radial direction of the feed shaft 331 and rearward from the base end thereof.

The feed roller 333 is attached to the extending end of the feed arm 332 so as to be rotatable about an axis along the left-right direction.

The driving force transmission mechanism 334 is housed in the feed arm 332 and includes a plurality of gears. The driving force transmission mechanism 334 transmits the driving force of a conveyance motor 46 (see FIGS. 5 to 8) to the feed roller 333. The feed roller 333 receives the driving force and rotates in the forward direction to apply a rearward force to the sheet 1 in the supply tray 31.

Due to the rotation of the feed roller 333, the sheet 1 is fed rearward in the supply tray 31, and then guided rearward and upward by the inclined surface of the sheet guide 312, and is sent to the upstream end of the first conveyance path 34.

As shown in FIG. 4A, the cam follower 335 extends leftward from approximately the center in the front-rear direction on the left side surface of the feed arm 332. The extending end of the cam follower 335 reaches the position of the extending end surface 313A (see FIG. 3B) in the left-right direction, and is contactable with the extending end surface 313A and the concave portion 313E.

The cam follower 335 is a part of the movement mechanism.

During the mounting process or the drawing process of the supply tray 31, the cam follower 335 contacts the extending end surface 313A and the concave portion 313E (see FIG. 3B), and moves up and down between the lower end of the concave portion 313E and the horizontal surface 313H.

[First Conveyance Path 34, Outer Guide Member 43, Inner Guide Member 44]

In FIG. 2, the first conveyance path 34 is indicated by the arrow of the single-dot chain line. The first conveyance path 34 is a so-called U-turn conveyance path. The first conveyance path 34 has an upstream end at a position immediately above the sheet guide 312. The first conveyance path 34 extends from its upstream end and reaches a nip position P4*c* of the third roller pair 39. In the first conveyance path 34, the sheet 1 is conveyed in a conveyance direction 5*a*.

Specifically, the first conveyance path 34 has a curved portion 341 and a straight portion 342. The curved portion 341 extends upward from the upstream end while curving to reach a nip position P4*a* of the first roller pair 35. The nip position P4*a* is a position upward and forward from the upstream end of the curved portion 341. The straight portion 342 is continuous with the downstream end of the curved portion 341 at the nip position P4*a*, extends substantially linearly from the downstream end of the curved portion 341 in the conveyance direction 5*a* (that is, forward), and reaches the nip position P4*c*.

As shown in FIG. 2, the printer unit 30 further includes an outer guide member 43 and an inner guide member 44.

As shown in FIG. 2, the outer guide member 43 is provided in the internal space 22 at the front side (that is, inside) of the cover 42 (see FIG. 1B) at the closed position P1*a*, and is movable between a conveyance position (an example of a fourth conveyance position) and a non-conveyance position (an example of a fourth non-conveyance position).

The conveyance position of the outer guide member 43 is the position when the cover 42 is at the closed position P1*a* (see FIG. 1B). When the outer guide member 43 is in the conveyance position, as shown by the solid line in FIG. 2, a curved surface 431 inside the outer guide member 43, together with the inner guide member 44, defines the curved portion 341 and covers the nip position P4*a* at a position rearward of the nip position P4*a*. In the conveyance position, the curved surface 431 defines almost the entire area from the upstream end to the downstream end of the curved portion 341.

The non-conveyance position of the outer guide member 43 is the position when the cover 42 is at the open position P1*b* (see FIG. 1B). In the non-conveyance position, as shown by the broken line in FIG. 2, the outer guide member 43 is separated rearward and downward further than that in the conveyance position, whereby the nip position P4*a* is exposed through the second opening 21B so that the user can access the curved portion 341 for clearing a jam (that is, the curved portion 341 is exposed to outside the housing 20 through the second opening 21B).

The outer guide member 43 may be integrally formed with the cover 42 or may be separately formed. In the case where the outer guide member 43 is integrally formed with the cover 42, the outer guide member 43 in the non-conveyance position is located at a position separated from the outer guide member 43 in the conveyance position in the circumferential direction of the axis 42*a*. In the case where the outer guide member 43 is separately formed, the outer guide member 43 may change its position between the conveyance position and the non-conveyance position by moving up and down in conjunction with the rotational movement of the cover 42 by a known slider crank mechanism.

The inner guide member 44 is located at the front side and the lower side of the outer guide member 43. The inner guide member 44 has an inner guide surface 441 that defines the vicinity of the downstream end of the curved portion 341. The inner guide surface 441 defines a portion of the curved portion 341 from a position above the downstream end of the second conveyance path 40 to the downstream end of the curved portion 341.

Figure 7:
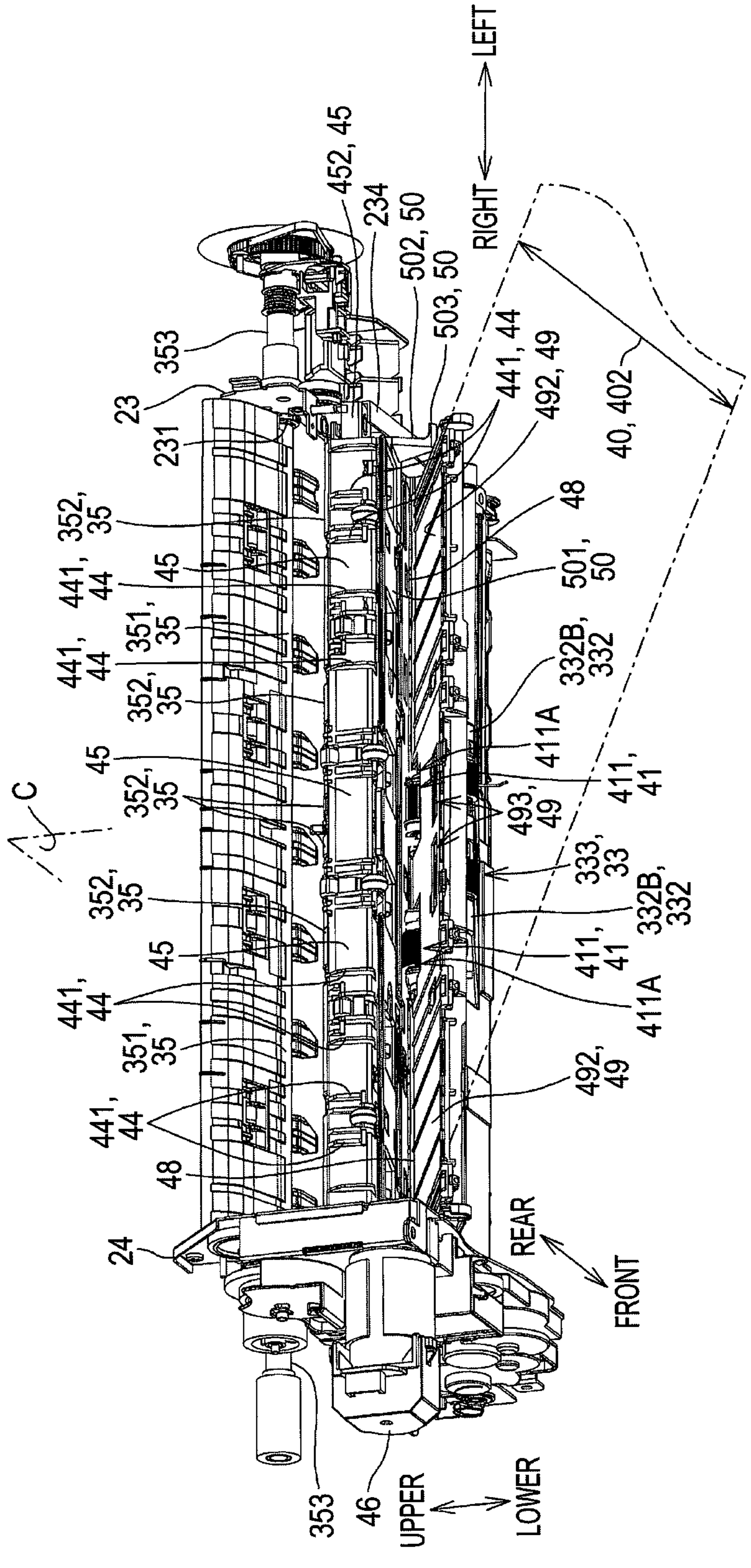
FIG. 7 is a perspective view of the components of the printer unit 30 when viewed diagonally from the right, the rear, and below.

Specifically, as shown in FIGS. 7, 9, and 10, the inner guide member 44 includes a plurality of ribs protruding rearward from the rear ends of roller holders 45 described later. The inner guide surface 441 is formed of protruding end faces of the plurality of ribs.

The inner guide member 44 rotationally moves together with the roller holders 45 in the circumferential direction of a shaft 383 to take a conveyance position (an example of a third conveyance position) and a non-conveyance position (an example of a third non-conveyance position).

Figure 13A:
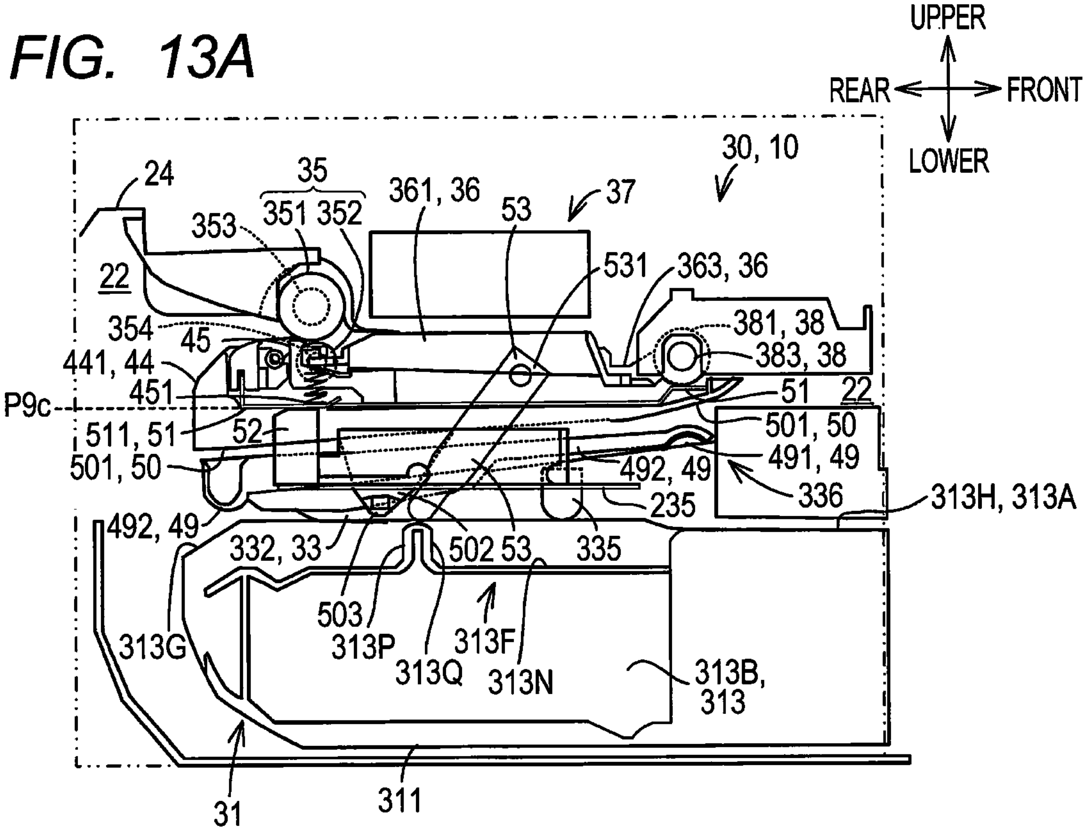
Figure 13B:
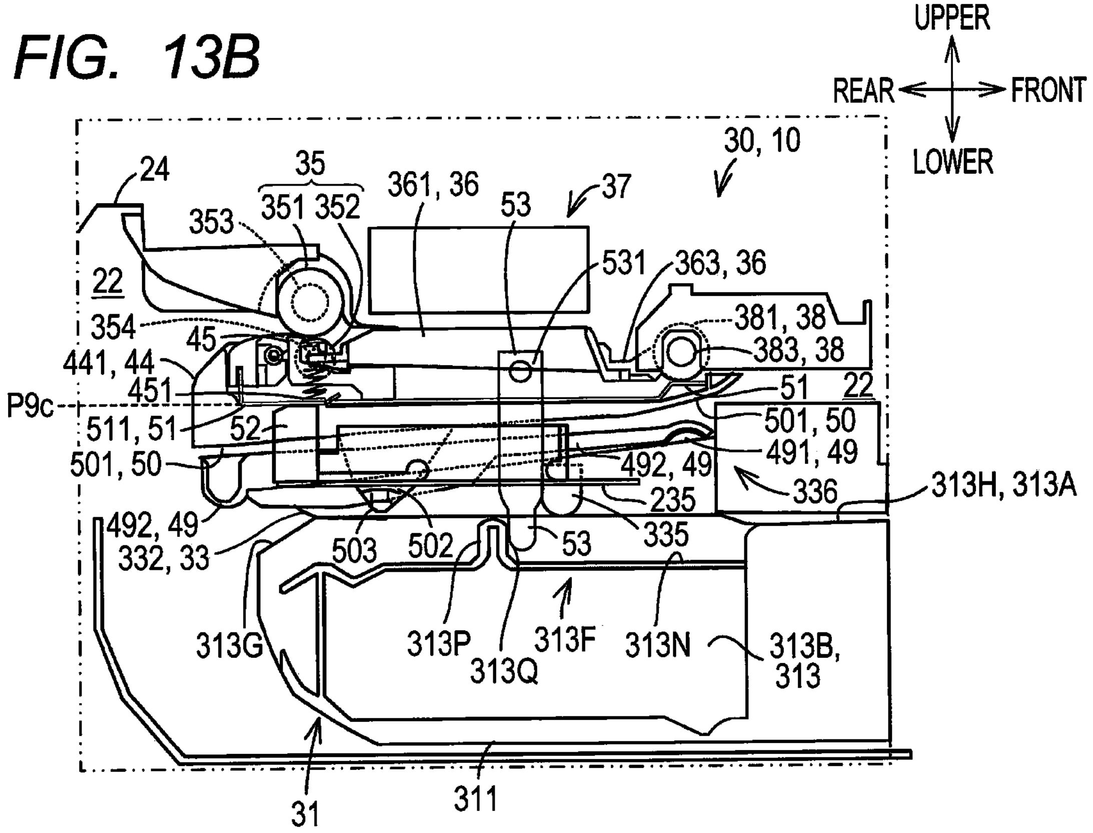

As shown in FIG. 13B, the conveyance position of the inner guide member 44 is the position when the supply tray 31 is at the mount position P2. In the conveyance position, the inner guide member 44, together with the outer guide member 43, defines the curved portion 341 of the first conveyance path 34.

Figure 11A:
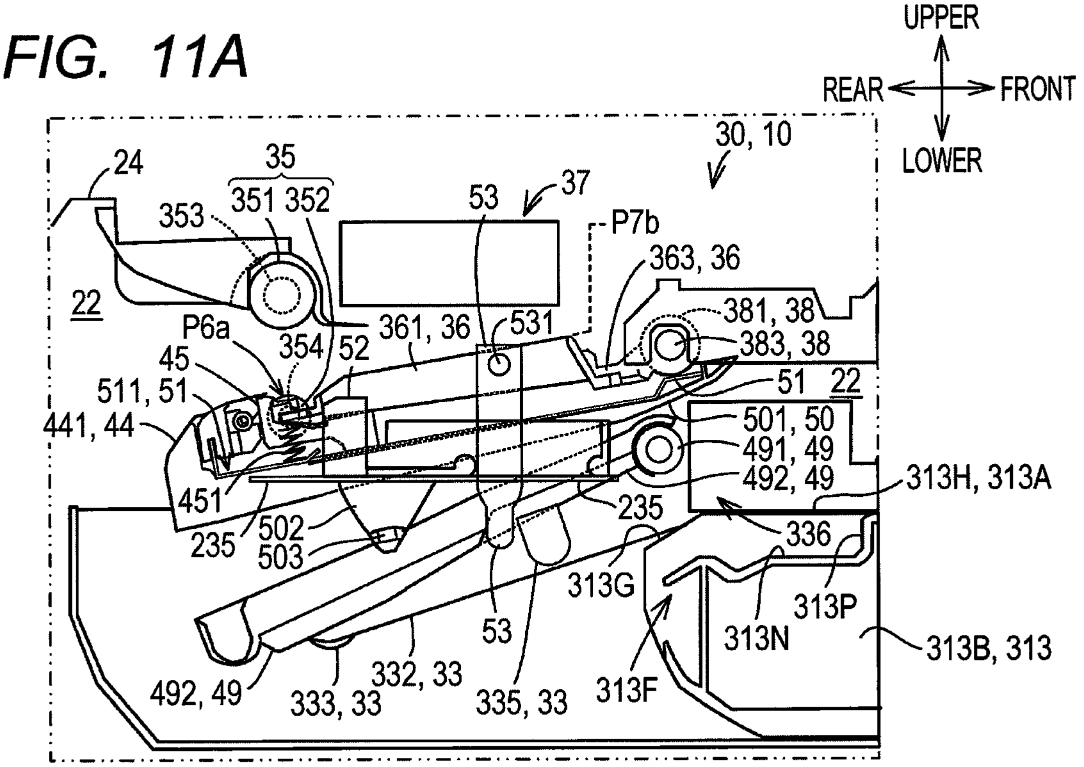

As shown in FIG. 11A, the non-conveyance position of the inner guide member 44 is the position when the supply tray 31 is pulled out. In the non-conveyance position, the inner guide member 44 is at a position rotated downward in the circumferential direction of the shaft 383 from the conveyance position.

[First Roller Pair 35]

In FIG. 2, the first roller pair 35 includes a pair of rollers 351, 352 in contact with each other at the nip position P4*a* (that is, the position of the downstream end of the curved portion 341). The roller 351 is an example of an upper roller, and the roller 352 is an example of a lower roller.

As shown in FIGS. 3A and 4A, the roller 351 is a drive roller and has a cylindrical shape extending in the left-right direction. A shaft 353 extends from the left and right ends of the roller 351. The shaft 353 is supported by bearings 231 and 241 provided at the left side frame 23 and the right side frame 24, respectively. The roller 351 is rotatable about the shaft 353.

As shown in FIG. 2, the lower end of the roller 351 is located at the nip position P4*a*.

The roller 352 includes a plurality of pinch rollers. The roller 352 moves between the nip position P4*a* (see FIG. 2) and a separation position P6*a* (see FIG. 4A) in conjunction with the movement mechanism (a link rod 52, a release lever 53) described later. The nip position P4*a* is the position of the roller 352 where the roller 352 contacts the roller 351 from below. The separation position P6*a* is lower than the nip position P4*a*, and is a position where the roller 352 separates from the roller 351 downward in the circumferential direction of the shaft 383. Hereinafter, unless otherwise specified, the term "roller 352" means "roller 352 located at the nip position P4*a*". The nip position P4*a* is an example of a first contact position. The separation position P6*a* is an example of a second lower position.

Figure 5:
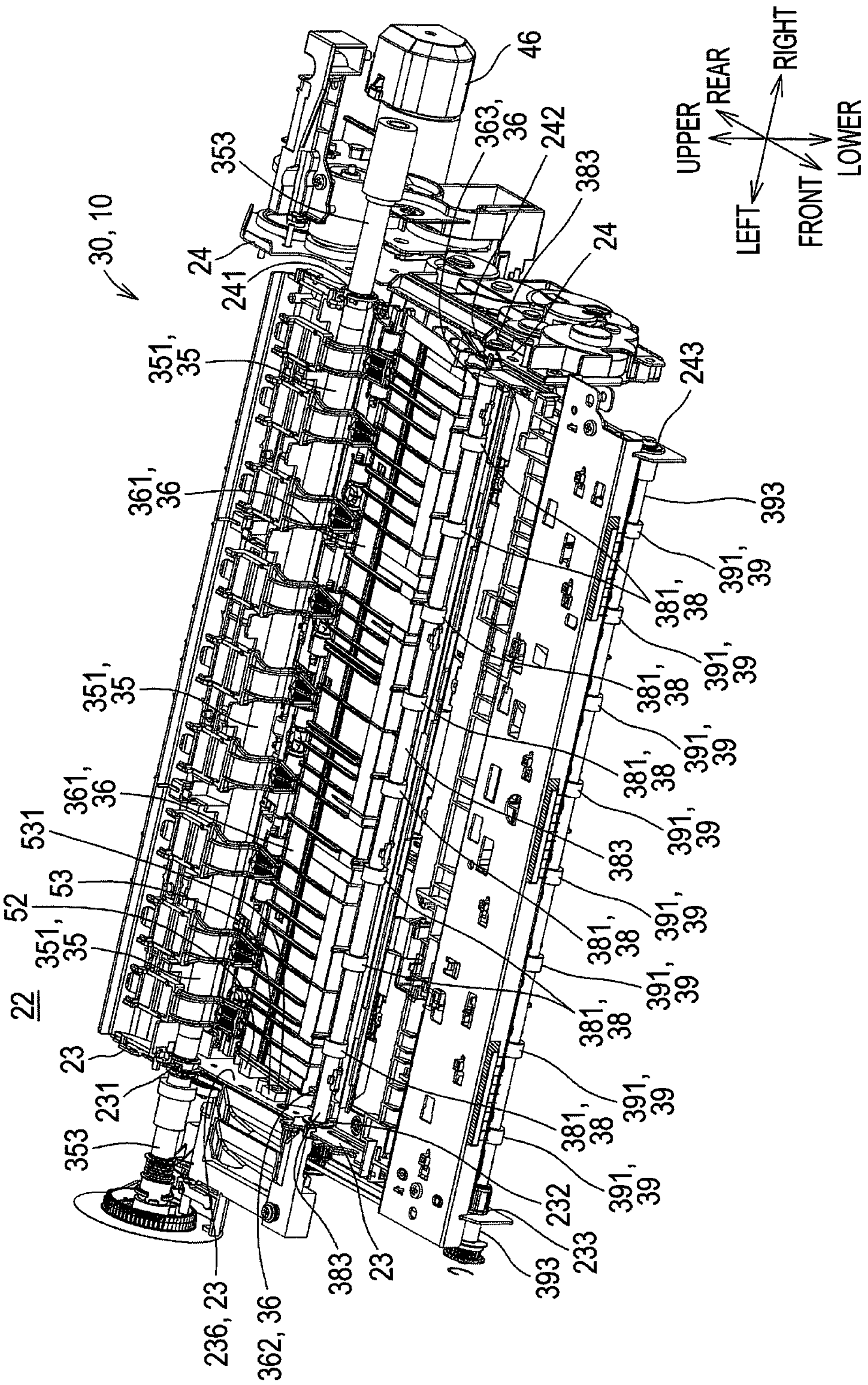
FIG. 5 is a perspective view of the components of the printer unit 30 when viewed diagonally from the right, the front, and above.

The roller 351 rotates in the forward direction about the shaft 353 by the driving force generated by the conveyance motor 46 (see FIG. 5). The roller 352 rotates by following the forward rotation of the roller 351. Thus, the first roller pair 35 nips the sheet 1 conveyed through the curved portion 341 and applies a forward force (that is, the conveyance direction 5*a*) to the sheet 1. As a result, the sheet 1 is sent to the straight portion 342.

[Platen 36]

In FIGS. 2, 3A, 4A, 5 and 6, the platen 36 is attached to the upper surface of a frame 51 described later. The platen 36 includes a platen main body 361, a left supported portion 362, and a right supported portion 363.

The platen main body 361 is located between the first roller pair 35 and the second roller pair 38 in the front-rear direction, and is located below the straight portion 342 (see FIG. 2) of the first conveyance path 34 in the vertical direction. The platen main body 361 has a substantially flat plate shape that is thin in the vertical direction and is longer than the straight portion 342 in the left-right direction.

Figure 6:
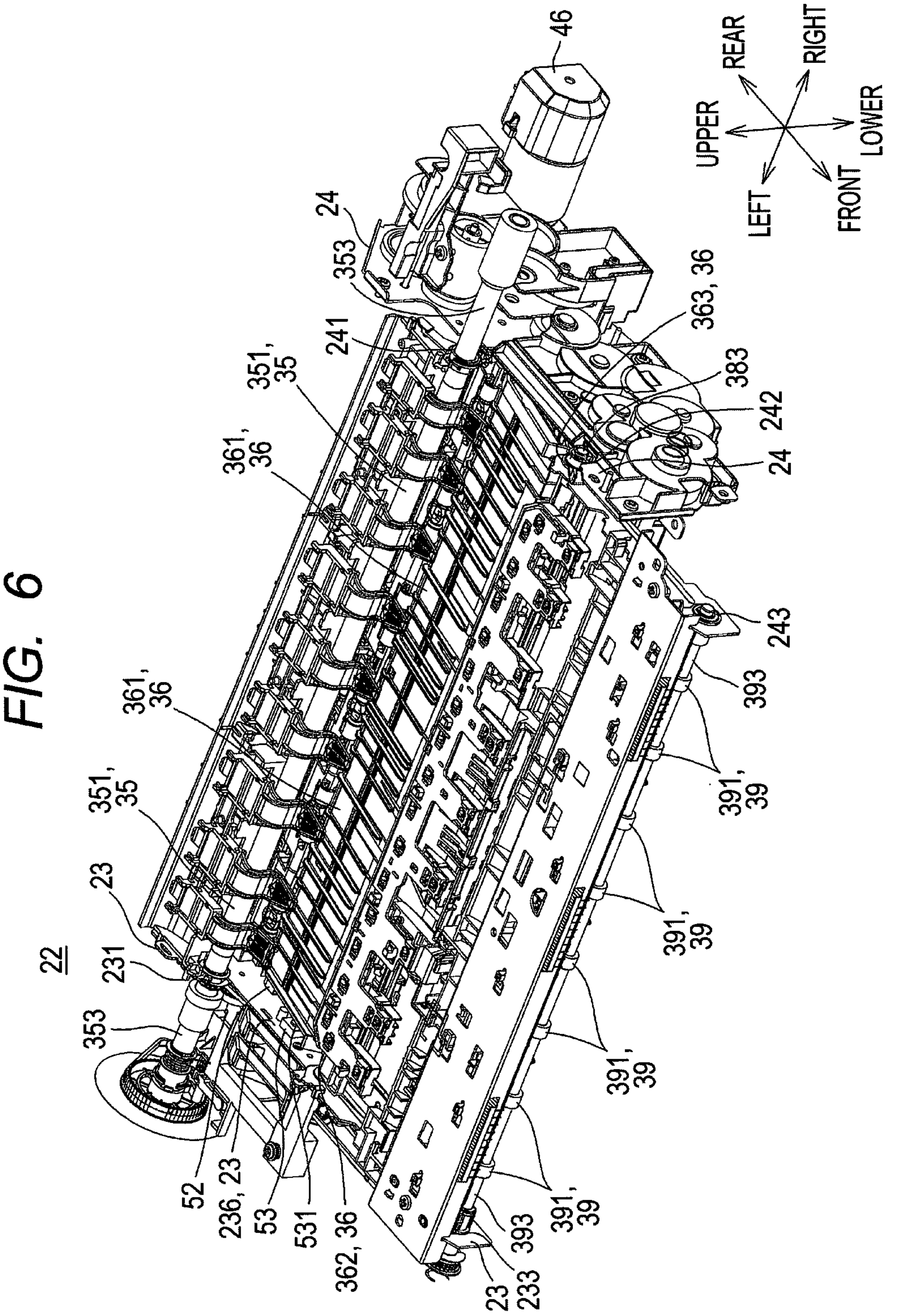
FIG. 6 is a perspective view of the components of the printer unit 30 when viewed diagonally from the right, the front, and above.

As shown in FIGS. 2, 5, and 6, the right supported portion 363 extends forward from the right front corner portion of the platen main body 361. As shown in FIG. 5, the tip end portion of the right supported portion 363 reaches to the right of a roller 381 on the shaft 383 of the second roller pair 38. The right supported portion 363 is formed with an engaging hole penetrating in the left-right direction. The right end of the shaft 383 is inserted into the engaging hole.

The left supported portion 362 has a symmetrical shape with the right supported portion 363, and hence the description thereof will be omitted.

The platen main body 361 is movable between a sheet support position P7*a* (see FIG. 3A, an example of a first support position) and a separation position P7*b* (see FIG. 4A, an example of a first lower position). At the sheet support position P7*a*, the upper surface of the platen main body 361 faces the lower surface of the recording head 37 from below with a small distance. At the separation position P7*b*, the rear end (an example of an end) of the upper surface of the platen main body 361 is separated downward from the sheet support position P7*a* in the circumferential direction of the shaft 383, so that the user can access the first conveyance path 34 through the second opening 21B. Hereinafter, unless otherwise specified, the term "platen 36" means "platen 36 located at the sheet support position P7*a*".

As shown in FIG. 2, the upper surface of the platen main body 361 extends in the front-rear direction and the left-right direction, and has a substantially rectangular planar shape that is long in the left-right direction. The platen main body 361 supports the sheet 1 conveyed through the straight portion 342 on the upper surface thereof.

[Frame 51]

In FIGS. 3A and 4A, the printer unit 30 further includes the frame 51 (an example of a frame). The frame 51 is a part of the movement mechanism. The frame 51 is made of metal and has a substantially flat plate shape that is thin in the vertical direction and long in the front-rear direction and the left-right direction. The frame 51 has a symmetrical shape. The frame 51 is fixed near the lower ends of the left supported portion 362 and the right supported portion 363 in the vicinity of the front end of the upper surface of the frame 51. That is, the frame 51 supports the platen 36 on its upper surface. The frame 51 extends rearward below the platen main body 361 approximately in parallel to the upper surface of the platen main body 361, and extends to a position rearward of the first roller pair 35. The rear end of the frame 51 rotationally moves in the circumferential direction of the shaft 383.

Figure 4B:
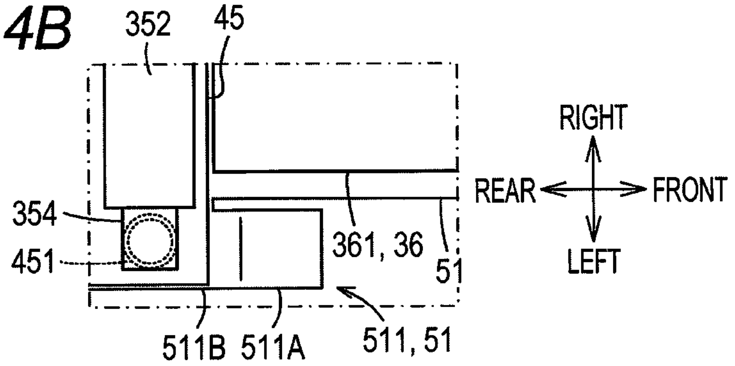
FIG. 4B is a schematic view of a protruding piece 511 formed at a left front corner of a frame 51 in FIG. 4A when viewed from the above.

On the upper surface of the frame 51 and rearward of the platen main body 361, a roller holder 45, together with the inner guide member 44, is attached along the rear end of the platen main body 361. As shown in FIGS. 4A and 4B, a flat plate-shaped protruding piece 511 protrudes to the left from a position leftward of the roller holder 45 in the vicinity of the left rear corner of the frame 51.

The protruding piece 511 has a first portion 511A and a second portion 511B. The first portion 511A is a portion including the front end of the protruding piece 511. The second portion 511B is connected to the rear end of the first portion 511A and is substantially parallel to the upper surface of the platen main body 361. The first portion 511A extends forward and upward from the front end of the second portion 511B and is inclined with respect to the second portion 511B.

A protruding piece similar to the protruding piece 511 is provided at the right end of the frame 51. Since this protruding piece is symmetrical with the protruding piece 511, a description thereof will be omitted.

[Roller Holder 45]

As shown in FIGS. 3A, 4A, 9 and 10, the roller holder 45 has a box-like shape with the upper side open and extending in the left-right direction, and has a symmetrical shape. The roller holder 45 supports a shaft 354 (see FIG. 3A, an example of a third shaft) extending in the left-right direction in its own internal space. The roller 352 is attached to the shaft 354 and is rotatable about the shaft 354. That is, the roller 352 is attached to the rear end of the platen main body 361 via the roller holder 45. The roller 352 protrudes slightly upward from the roller holder 45. The roller holder 45 rotationally moves in the circumferential direction of the shaft 383 together with the platen 36 in conjunction with the rotational movement of the platen 36.

The roller 352 and the shaft 354 are supported in the roller holder 45 so as to move in a direction perpendicular to the upper surface of the frame 51. As shown in FIGS. 3A, 4A, and 4B, a coil spring 451 is located leftward of the roller 352 in the roller holder 45. The coil spring 451 is interposed between the upper surface of the frame 51 and the left end of the shaft 354. Specifically, the lower and upper ends of the coil spring 451 contact the protruding piece 511 of the frame 51 and the shaft 354, respectively. Thus, the coil spring 451 applies an upward urging force to the shaft 354. The coil spring 451 is an example of an urging member.

As shown in FIG. 7, a protrusion 452 protrudes to the left from the left end of the roller holder 45. A stopper 234 protrudes to the right from the left side frame 23. The vertical position of the stopper 234 is above the supply tray 31 (see FIG. 3A), and the front-rear position of the stopper 234 is near the rear end of the supply tray 31. The stopper 234 contacts the protrusion 452 of the roller holder 45 from below (see FIG. 8) to regulate the rotational movement of the roller holder 45 so that the roller holder 45 does not move below the stopper 234. In other words, the stopper 234 regulates the rotational movement of the roller holder 45 so that the platen main body 361 does not move below the separation position P7*b*.

In the roller holder 45, a coil spring symmetrical with the coil spring 451 is located to the right of the roller 352. A stopper symmetrical with the stopper 234 protrudes to the left from the right side frame 24. A protrusion symmetrical with the protrusion 452 protrudes from the right end of the roller holder 45. The coil spring, the stopper, and the protrusion at the right side are symmetrical with the coil spring 451, the stopper 234, and the protrusion 452. Thus, their illustration and description will be omitted.

[Recording Head 37]

In FIGS. 2, 3A, and 4A, the recording head 37 ejects ink toward the upper surface of the platen 36 at a position slightly separated upward from the platen 36 from nozzle holes formed in the lower surface of the recording head 37. The recording head 37 ejects ink under the control of the controller, and an image based on the image data is recorded on the sheet 1 on the platen main body 361.

[Second Roller Pair 38]

In FIGS. 2 to 5, the second roller pair 38 is located forward of the platen 36 and the recording head 37. The second roller pair 38 has a pair of rollers 381 and 382 in contact with each other at a nip position P4*b* (see FIG. 2).

As shown in FIG. 5, the roller 381 includes a plurality of rollers. The roller 381 extends in the left-right direction (an example of a crossing direction) and is rotatable about the shaft 383 (an example of a first shaft) supported by bearings 232 and 242 of the left side frame 23 and the right side frame 24.

In FIG. 2, the upper end of the roller 381 is located at the nip position P4*b*. The roller 382 is a spur roller for example, and contacts the roller 381 from above.

The roller 381 rotates in the forward direction about the shaft 383 by the driving force generated by the conveyance motor 46 (see FIG. 5). The roller 382 rotates by following the forward rotation of the roller 381. Thus, the second roller pair 38 nips the sheet 1 conveyed through the straight portion 342 of the first conveyance path 34, and applies a forward force (that is, in the conveyance direction 5*a*) to the sheet 1. As a result, the sheet 1 is conveyed farther forward through the straight portion 342.

[Third Roller Pair 39]

In FIG. 2, the third roller pair 39 is located forward of the second roller pair 38 (that is, downstream in the conveyance direction 5*a*) in the straight portion 342 of the first conveyance path 34. The third roller pair 39 has a pair of rollers 391 and 392 in contact with each other at the nip position P4*c*.

As shown in FIG. 5, the roller 391 includes a plurality of rollers. The roller 391 extends in the left-right direction, and is rotatable about a shaft 393 supported by bearings 233 and 243 of the left side frame 23 and the right side frame 24.

In FIG. 2, the upper end of the roller 391 is located at the nip position P4*c*. The roller 392 is a spur roller for example, and contacts the roller 391 from above.

The roller 391 rotates about the shaft 393 by the driving force generated by the conveyance motor 46 (see FIG. 5). The roller 392 rotates by following the rotation of the roller 391. The conveyance motor 46 rotates in the forward direction or the reverse direction under the control of the controller. When the conveyance motor 46 rotates in the forward direction, the roller 391 rotates in the forward direction. Thus, the third roller pair 39 nips the sheet 1 conveyed through the straight portion 342 of the first conveyance path 34, and applies a forward force (that is, in the conveyance direction 5*a*) to the sheet 1. As a result, the sheet 1 is discharged from the first conveyance path 34 to the discharge tray 32. When the conveyance motor 46 rotates in the reverse direction, the roller 391 rotates in the reverse direction. Thus, the third roller pair 39 applies a rearward force (that is, the direction opposite the conveyance direction 5*a*) to the nipped sheet 1. As a result, the sheet 1 is conveyed from the nip position P4*c* in the direction opposite the conveyance direction 5*a* in the straight portion 342.

[Flap 47]

In FIG. 2, the printer unit 30 further includes a flap 47. The flap 47 is located between the second roller pair 38 and the third roller pair 39 in the straight portion 342 of the first conveyance path 34. The flap 47 extends in the conveyance direction 5*a* from a shaft 471 located above the straight portion 342, and is rotationally movable about the shaft 471 between a discharge position and a reversing position. The flap 47 is supported by the shaft 471 between the left side frame 23 and the right side frame 24 (see FIG. 5). The discharge position is a position where the sheet 1 can be discharged to the discharge tray 32, and is a position substantially along the upper side of the straight portion 342. The reversing position is a position where the extending end of the flap 47 is lower than at the discharge position. In FIG. 2, the flap 47 at the discharge position is shown by the broken line, and the flap 47 at the reversing position is shown by the solid line.

In a state where no force other than gravity is applied, the flap 47 is located at the reversing position due to its own weight. While the flap 47 is in contact with the sheet 1 conveyed through the straight portion 342 of the first conveyance path 34, the flap 47 is lifted from the reversing position to the discharge position by the contact force applied by the sheet 1 and the stiffness of the sheet 1. When the trailing end of the sheet 1 separates from the extending end of the flap 47, the flap 47 rotationally moves from the discharge position to the reversing position due to its own weight. In this state, when the rotation of the third roller pair 39 in the forward direction is continued, the sheet 1 is conveyed in the conveyance direction 5*a* and discharged to the discharge tray 32. When the rotation direction of the third roller pair 39 is switched to the opposite direction, the sheet 1 is conveyed in the direction opposite the conveyance direction 5*a* and is conveyed to the curved portion 341 through the second conveyance path 40.

[Second Conveyance Path 40, Fixed Lower Guide Member 48]

In FIG. 2, the second conveyance path 40 connects a branch position in the straight portion 342 of the first conveyance path 34 and a merging position in the curved portion 341. The branch position is the position between the extension end of the flap 47 at the discharge position and the third roller pair 39 in the straight portion 342. The merging position is a position slightly below the lower end of the inner guide surface 441 in the curved portion 341.

The second conveyance path 40 has an upstream portion 401 and a downstream portion 402. The upstream portion 401 passes below the straight portion 342 from the branch position. The upstream portion 401 reaches a position slightly above the feed shaft 331 and slightly below the front end of the movable upper guide member 50. The downstream portion 402 passes below the movable upper guide member 50 from the downstream end of the upstream portion 401 to reach the merging position.

The second conveyance path 40 is defined by the fixed lower guide member 48, the movable lower guide member 49, and the movable upper guide member 50.

In FIG. 2, the fixed lower guide member 48 is supported between the left side frame 23 and the right side frame 24 (see FIG. 5), and forms the lower side of the upstream portion 401.

[Fourth Roller Pair 41]

In FIG. 2, the fourth roller pair 41 is located at a position near the downstream end of the upstream portion 401 and forward of the feed shaft 331 in the front-rear direction. The fourth roller pair 41 has a pair of rollers 411 and 412 in contact with each other at a nip position P4*d*.

As shown in FIG. 7, the roller 411 is a drive roller and includes a plurality of cylindrical rollers extending in the left-right direction. Each of the plurality of rollers is located in a hole 411A formed in a center portion in the left-right direction in the fixed lower guide member 48 and the movable lower guide member 49. The roller 411 is supported by bearings provided at both the left and right sides of the hole 411A, and is rotatable about the axis of the roller 411 extending in the left-right direction.

In FIG. 2, the upper end of the roller 411 is located at the nip position P4*d*. The roller 412 is a spur roller or a pinch roller, and contacts the roller 411 from above.

The roller 411 rotates about its own axis by the driving force generated by the conveyance motor 46 (see FIG. 5). The roller 412 rotates by following the rotation of the roller 411. Thus, the fourth roller pair 41 nips the sheet 1 conveyed through the upstream portion 401 and applies a rearward force (that is, a force in the direction opposite the conveyance direction 5*a*) to the sheet 1. As a result, the sheet 1 is conveyed to the downstream portion 402 and heads for the merging position.

[Movable Lower Guide Member 49]

As shown in FIG. 2, the movable lower guide member 49 (an example of a lower guide member) is located below the movable upper guide member 50 and above the feed mechanism 33 in the vertical direction.

In FIGS. 2, 4A, 7 and 8, the movable lower guide member 49 has a shaft 491, a lower guide main body 492, and a hole 493.

The shaft 491 is located at a position upward and rearward of the feed shaft 331. The shaft 491 extends in the left-right direction, and the left end and the right end of the shaft 491 are supported by the left side frame 23 and the right side frame 24 (see FIG. 5), respectively.

The lower guide main body 492 is supported at its base end (that is, the front end) so as to be rotationally movable in the circumferential direction of the shaft 491, and extends in a radial direction of the shaft 491 to its tip end (that is, the rear end). The lower guide main body 492 is located above the feed mechanism 33 in the internal space 22.

The lower guide main body 492 has a substantially flat plate shape that is thin in the vertical direction and long in the front-rear direction and the left-right direction. The lower guide main body 492 has an upper surface. The upper surface of the lower guide main body 492 has a symmetrical shape, and as shown in FIG. 7, has a left-right width slightly wider than the downstream portion 402 of the second conveyance path 40.

The lower guide main body 492 is located above the feed arm 332, and is rotationally movable in the circumferential direction of the shaft 491 between a conveyance position (an example of a second conveyance position) and a non-conveyance position (an example of a second non-conveyance position) in conjunction with the rotational movement of the feed arm 332.

As shown in FIG. 3A, the conveyance position is the position of the lower guide main body 492 when the supply tray 31 is at the mount position P2. In the conveyance position, the upper surface of the lower guide main body 492 forms the lower side of the downstream portion 402 of the second conveyance path 40.

As shown in FIG. 4A, the non-conveyance position is the position of the lower guide main body 492 when the supply tray 31 is pulled out. In the non-conveyance position, the rear end of the upper surface of the lower guide main body 492 is at a position rotationally moved downward in the circumferential direction of the shaft 491 from the conveyance position.

Figure 8:
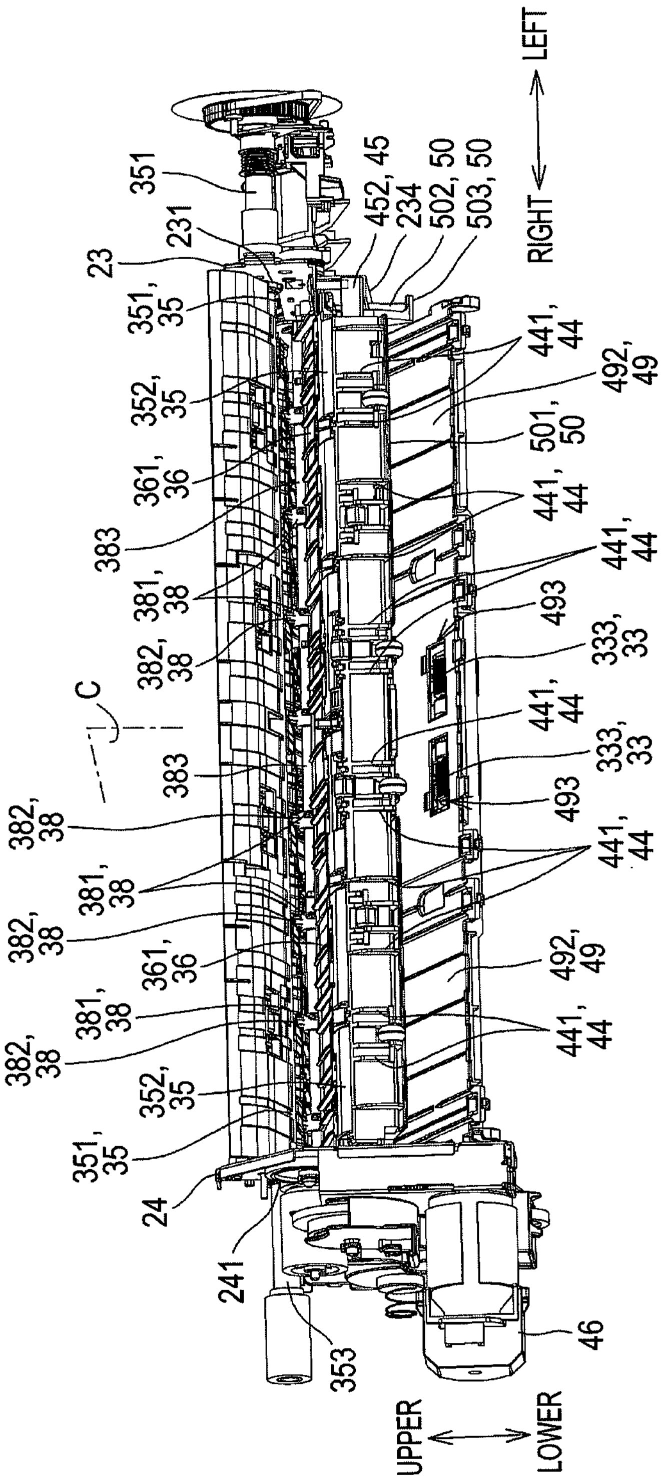
FIG. 8 is a perspective view of the components of the printer unit 30 when the platen 36 is at a separation position P7*b* shown in FIG. 4A when viewed diagonally from the right, the rear, and below.

As shown in FIGS. 7 and 8, the hole 493 is formed to penetrate from the upper surface to the lower surface of the lower guide main body 492. With this configuration, the lower guide main body 492 in the conveyance position does not interfere with the feed roller 333, and hence the feed roller 333 rotates stably.

[Movable Upper Guide Member 50]

As shown in FIG. 2, the movable upper guide member 50 (an example of an upper guide member) is attached to the lower surface side of the frame 51 and is located above the movable lower guide member 49.

In FIGS. 2 and 7, the movable upper guide member 50 includes an upper guide main body 501, an arm 502, and a protrusion 503.

In FIG. 2, the upper guide main body 501 has a substantially flat plate shape that is thin in the vertical direction and long in the front-rear direction and the left-right direction. The upper guide main body 501 has a lower surface facing downward. The lower surface of the upper guide main body 501 has a symmetrical shape, and as shown in FIG. 7, has a left-right width slightly wider than the downstream portion 402 of the second conveyance path 40.

The upper guide main body 501 rotationally moves in the circumferential direction of the shaft 383 in conjunction with the rotational movement of the platen 36 and the frame 51 so as to take a conveyance position (an example of a first conveyance position) (see FIG. 3A) and a non-conveyance position (an example of a first non-conveyance position) (see FIG. 4A).

In FIG. 3A, the conveyance position is the position of the upper guide main body 501 when the supply tray 31 is at the mount position P2. In the conveyance position, the lower surface of the upper guide main body 501 forms the upper side of the downstream portion 402 of the second conveyance path 40.

In FIG. 4A, the non-conveyance position is the position of the upper guide main body 501 when the supply tray 31 is pulled out. In the non-conveyance position, the rear end of the lower surface of the upper guide main body 501 is at a position rotationally moved downward in the circumferential direction of the shaft 383 from the conveyance position.

In FIG. 7, the arm 502 having a flat plate shape that is thin in the left-right direction is located at the left side surface of the upper guide main body 501. The arm 502 extends downward. The protrusion 503 protrudes to the left from the extending end of the arm 502. The extending end of the protrusion 503 reaches the extending end surface 313A of the supply tray 31 in the left-right direction.

During the mounting process and the drawing process of the supply tray 31, the protrusion 503 moves relative to the supply tray 31 on the extending end surface 313A. Thus, the protrusion 503 moves up and down between a position of the horizontal surface 313H and a position lower than the horizontal surface 313H.

An arm and a protrusion are located at the right side surface of the upper guide main body 501. The arm and the protrusion at the right side are symmetrical with the arm 502 and the protrusion 503, and thus their illustration and description will be omitted.

[Link Rod 52 (Movement Mechanism)]

As shown in FIGS. 3A and 4A, the printer unit 30 further includes a link rod 52. The link rod 52 is a part of a movement mechanism.

As shown in FIG. 5, the left side frame 23 has a right side surface 236. In FIGS. 3A and 4A, a horizontal guide member 235 (an example of a guide member) is a metal plate that is thin in the vertical direction and extends in the front-rear direction (specifically, the drawing direction). The horizontal guide member 235 extends rightward from the right side surface 236 (see FIG. 5). Since the left side frame 23 is located leftward of the supply tray 31, the left side frame 23 is not shown in FIGS. 3A and 4A. As shown in FIG. 3A, the horizontal guide member 235 is located above the horizontal surface 313H of the supply tray 31 in the vertical direction and near the left side of the movable upper guide member 50 in the conveyance position. The horizontal guide member 235 is a part of the movement mechanism.

Figure 4C:
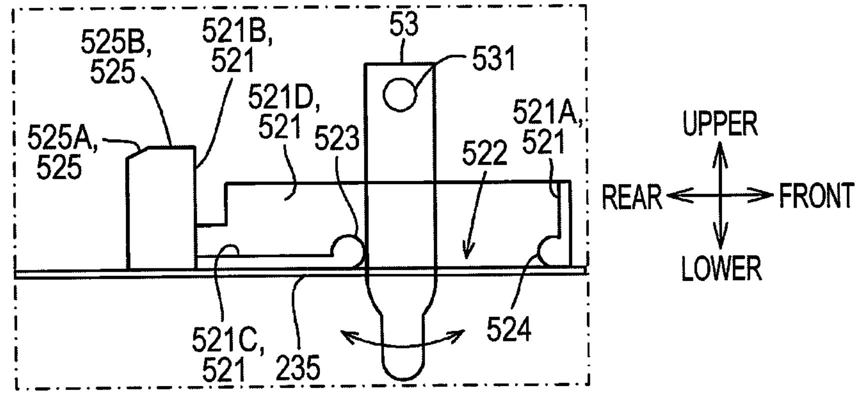
FIG. 4C is a left side view of a link rod 52 and a release lever 52 in FIG. 4A.

As shown in FIGS. 4A and 4C, the link rod 52 is a resin member that is thin in the left-right direction and long in the front-rear direction. The link rod 52 is supported by the horizontal guide member 235 so as to be movable in the front-rear direction on the horizontal guide member 235. As shown in FIG. 4C, the link rod 52 has a concave portion 521, a through hole 522, a first contact surface 523, a second contact surface 524, and an upper surface 525.

In FIG. 4C, the concave portion 521 has a front surface 521A, a rear surface 521B, a bottom surface 521C, and a right surface 521D, and defines a space opened leftward and upward.

The through hole 522 is formed to penetrate vertically from the bottom surface 521C of the concave portion 521 to the lower end surface of the link rod 52. The through hole 522 has a rectangular shape that is long in the front-rear direction in a plan view. The first contact surface 523 and the second contact surface 524 form the through hole 522. The first contact surface 523 is separated from the second contact surface 524 rearward of the second contact surface 524 with the through hole 522 interposed therebetween. The first contact surface 523 is an example of a first contact portion, and the second contact surface 524 is an example of a second contact portion.

The upper surface 525 has an inclined surface 525A and a horizontal surface 525B. The inclined surface 525A is a surface extending forward and upward from a position lower than the horizontal surface 525B at the rear end of the link rod 52. The inclined surface 525A is parallel to the left-right direction.

The horizontal surface 525B is a flat surface extending forward from the front end of the inclined surface 525A and parallel to the front-rear direction and the left-right direction. The front end of the horizontal surface 525B is rearward of the first contact surface 523. The vertical position of the horizontal surface 525B is the same as the position of the lower surface of the protruding piece 511 of the frame 51 when the platen main body 361 is located at the sheet support position P7*a*.

[Release Lever 53 (Movement Mechanism)]

As shown in FIGS. 3A, 4A, 5 and 6, the printer unit 30 further includes a release lever 53. The release lever 53 is a part of the movement mechanism.

As shown in FIG. 5, a shaft 531 (an example of a second shaft) protrudes rightward from the right side surface 236 of the left side frame 23. As shown in FIG. 3A, the vertical position of the shaft 531 is above the upper surface 525 of the link rod 52 and the horizontal guide member 235 and below the upper surface of the platen main body 361. The front-rear position of the shaft 531 is slightly forward of the center in the front-rear direction of the horizontal guide member 235. The shaft 531 is a part of the movement mechanism.

As shown in FIG. 4C, the release lever 53 is supported by the shaft 531 at the base end so as to rotationally move in the circumferential direction of the shaft 531. The release lever 53 extends from the base end in a radial direction of the shaft 531, passes through the through hole 522, and further extends downward. The extending end of the release lever 53 is located at the same position as the protrusion 313F of the supply tray 31 in the left-right direction, and extends to a position below the horizontal surface 313H of the supply tray 31 in the vertical direction.

[Operation of Printer Unit 30]

Hereinafter, the operation of the printer unit 30 will be described with reference to FIGS. 3A, 3B, 4A, 4B, and 11 to 14.

[Operation in Mounting Process of Supply Tray 31]

First, the operation of the printer unit 30 in the mounting process of the supply tray 31 will be described with reference to FIGS. 3A to 13A.

As shown in FIG. 4A, before the supply tray 31 is inserted into the internal space 22, the tip end of the feed arm 332 of the feed mechanism 33 is stationary at a lower position P8*a* in the circumferential direction of the feed shaft 331. At this time, the cam follower 335 is stationary at a position below the vertical position of the horizontal surface 31311.

When the feed arm 332 is at the lower position P8*a*, the movable lower guide member 49 takes a non-conveyance position (see FIG. 4A). In the non-conveyance position, the lower guide main body 492 of the movable lower guide member 49 contacts the upper surface of the feed arm 332, and is located at a position rotationally moved downward in the circumferential direction of the shaft 491 from the conveyance position (see FIG. 3A).

As shown in FIG. 4A, before inserting of the supply tray 31, the rear end of the frame 51 is stationary at a lower position P9*a* due to contact between the protrusion 452 and the stopper 234 (see FIG. 7) in the circumferential direction of the shaft 383. When the frame 51 is stationary at the lower position P9*a*, the platen main body 361 and the roller 352 are located at the separation positions P7*b* and P6*a*, respectively, and the movable upper guide member 50 takes a non-conveyance position. In the non-conveyance position, the upper guide main body 501 of the movable upper guide member 50 is rotationally moved downward in the circumferential direction of the shaft 383 from the conveyance position (see FIG. 3A), and is located at a position separated upward from the lower guide main body 492 of the movable lower guide member 49. Further, the inner guide member 44 takes a non-conveyance position.

As shown in FIG. 4A, the release lever 53 extends downward from base end near the shaft 531. In the front-rear direction, the first contact surface 523 (see FIG. 4C) of the link rod 52 contacts the rear surface of the release lever 53 from the rear. At this time, the front end of the link rod 52 is stationary at a front-rear position P10*a*, which is the most forward in the movable range in the front-rear direction. When the link rod 52 is at the front-rear position P10*a* (an example of a non-support position), the inclined surface 525A of the link rod 52 (see FIG. 4C) is located upward of the protruding piece 511 of the frame 51 and forward of the front end of the protruding piece 511. That is, when the link rod 52 is at the front-rear position P10*a*, the link rod 52 does not support the frame 51.

As shown in FIG. 11A, in the process in which the supply tray 31 is inserted into the internal space 22 and reaches the mount position P2 (that is, the mounting process), the rear end of the supply tray 31 (specifically, the upper and rear end of the sheet guide 312 (see FIG. 2)) starts to contact the lower surface of the feed arm 332 at the lower position P8*a*. Thus, an upward force is applied to the feed arm 332. As a result, the feed arm 332 rotationally moves upward from the lower position P8*a* in the circumferential direction of the feed shaft 331. Further, the lower guide main body 492 of the movable lower guide member 49 rotationally moves upward in the circumferential direction of the shaft 491 from the position in the non-conveyance position (see FIG. 4A) due to the upward force received from the feed arm 332.

Figure 11B:
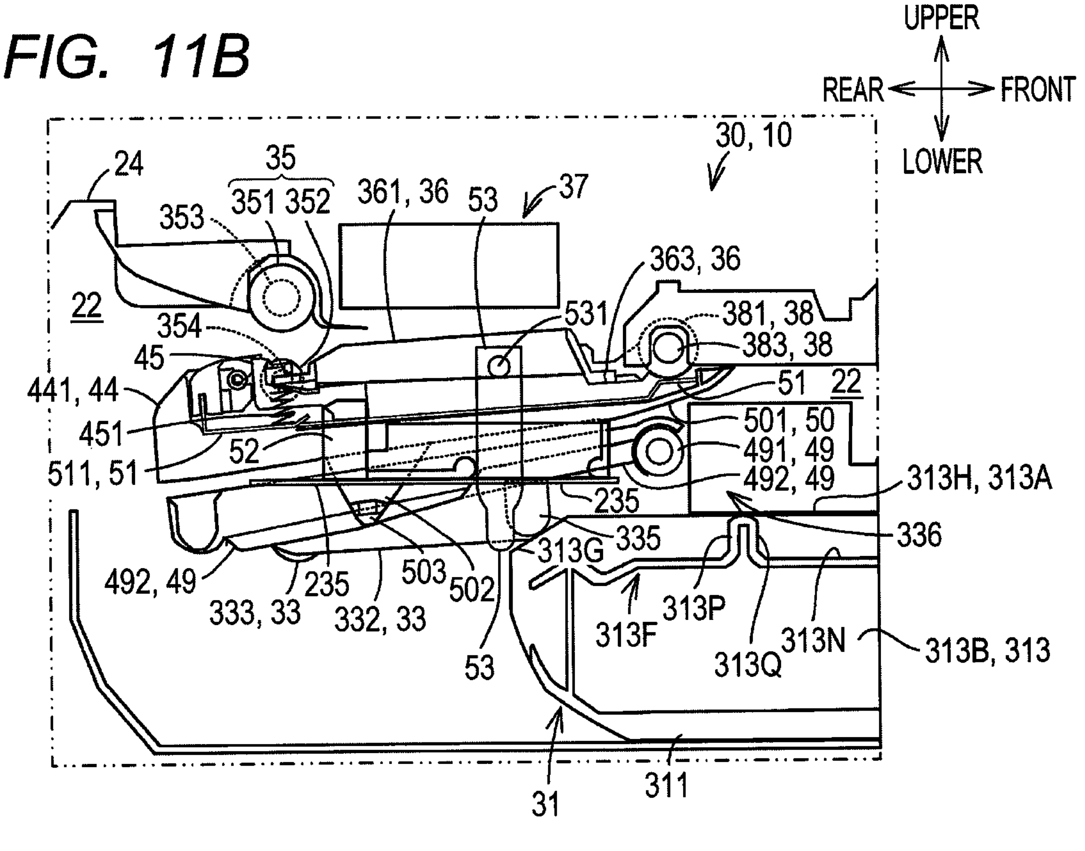

As shown in FIG. 11B, the supply tray 31 moves farther rearward toward the mount position P2 even after contacting the feed arm 332. Then, the cam follower 335 first contacts the inclined surface 313G, starts to move on the inclined surface 313G relative to the inclined surface 313G, and then moves on the horizontal surface 313H relative to the horizontal surface 31311. As a result, the cam follower 335 moves upward, and the feed arm 332 moves farther upward in the circumferential direction of the feed shaft 331.

Figure 12A:
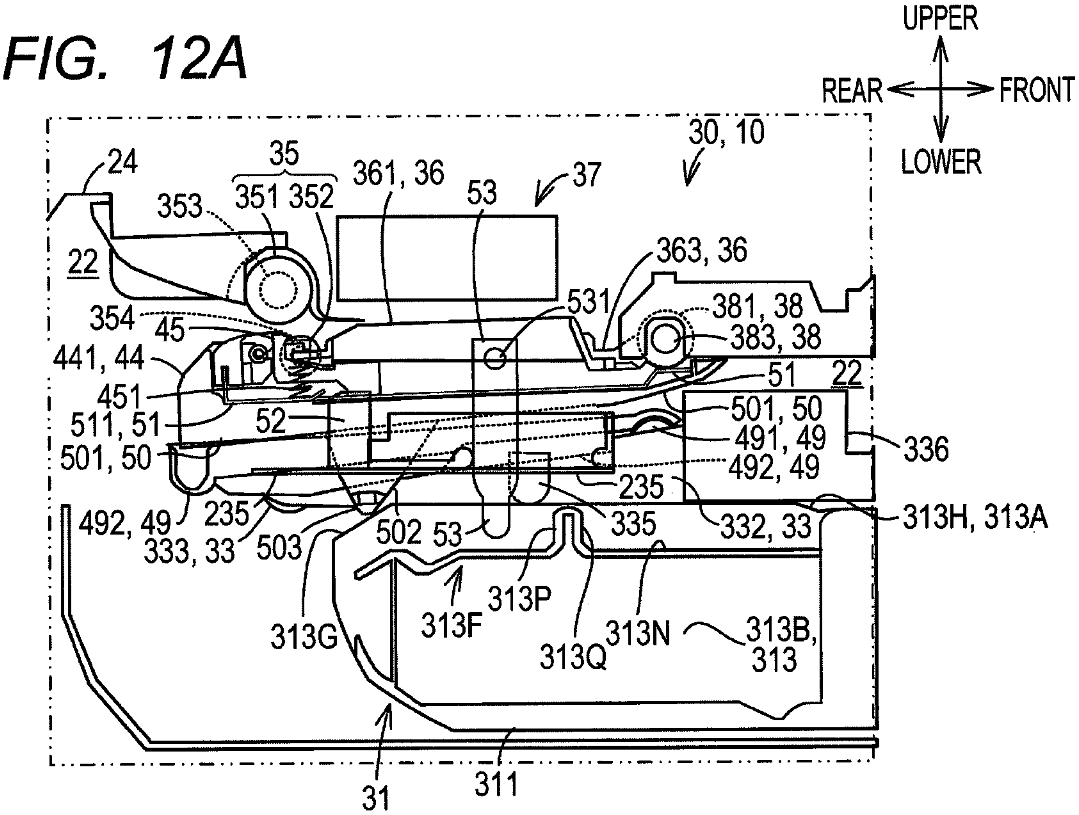

In FIG. 12A, after the cam follower 335 contacts the horizontal surface 313H, the protrusion 503 contacts the inclined surface 313G and moves on the inclined surface 313G relative to the inclined surface 313G. As a result, the protrusion 503 moves upward, and the frame 51 starts to move upward from the lower position P9*a* (see FIG. 4A) in the circumferential direction of the shaft 383. The vertical position of the horizontal surface 31311 contacted by the cam follower 335 is an example of a contact position.

Figure 12B:
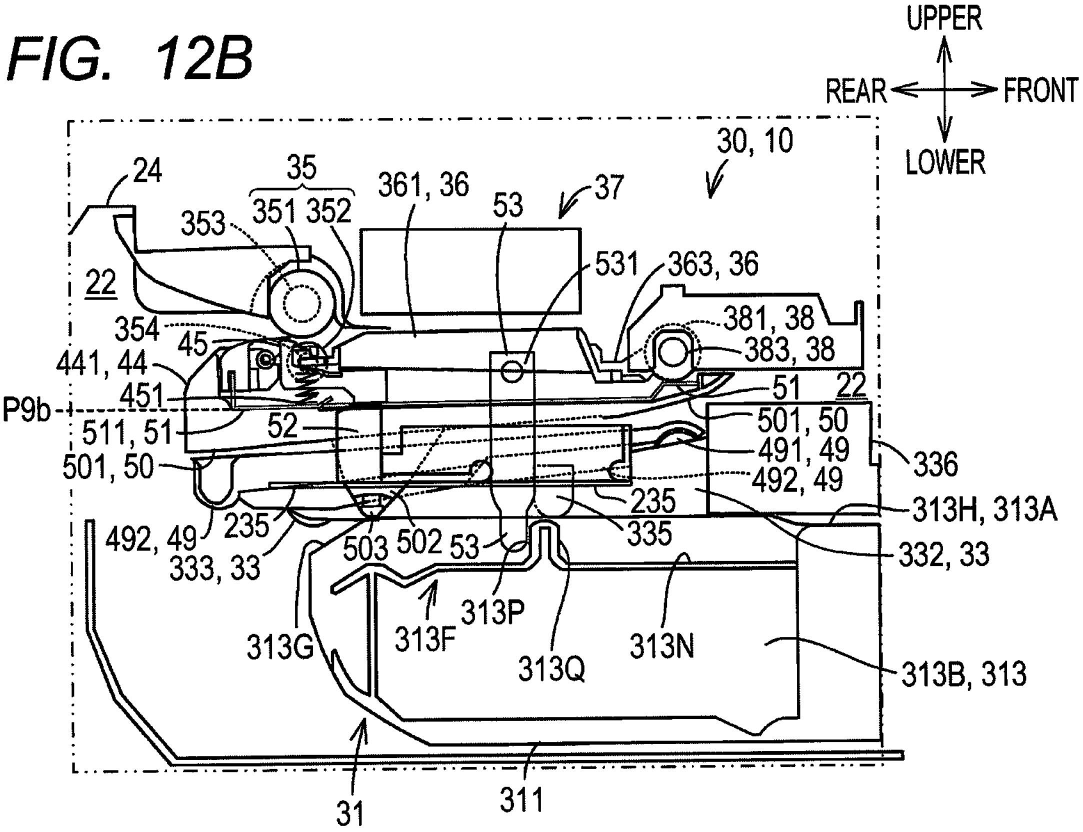

As shown in FIG. 12B, when the protrusion 503 moves relatively from the inclined surface 313G to the horizontal surface 31311, the frame 51 reaches an intermediate position P9*b* in the circumferential direction of the shaft 383. When the frame 51 is located at the intermediate position P9*b*, the first portion 511A of the protruding piece 511 of the frame 51 reaches directly rearward of the inclined surface 525A of the link rod 52 in the front-rear direction, and reaches almost the same position as the inclined surface 525A in the vertical direction and the left-right direction. Further, the rear surface 313P of the protrusion 313F of the supply tray 31 contacts the release lever 53 from the front.

As shown in FIG. 13A, even after the rear surface 313P contacts the release lever 53, the supply tray 31 moves farther rearward toward the mount position P2. At this time, the rear surface 313P applies a rearward force to the release lever 53, and the release lever 53 rotationally moves upward and rearward in the circumferential direction of the shaft 531 and applies a rearward force to the first contact surface 523 of the link rod 52 (see FIG. 4C). As a result, the link rod 52 starts to move rearward from the front-rear position P10*a* (see FIG. 4A), and the inclined surface 525A (see FIG. 4C) contacts the first portion 511A of the protruding piece 511 from below. By moving rearward, the inclined surface 525A causes the first portion 511A to move upward. After that, the horizontal surface 525B (see FIG. 4C) contacts the second portion 511B from below and supports the second portion 511B from below in a horizontal orientation. That is, the lower surface of the second portion 511B reaches the same vertical position as the horizontal surface 525B. As a result, the frame 51 reaches an upper position P9*c* supported by the horizontal surface 525B of the link rod 52 above the intermediate position P9*b* in the circumferential direction of the shaft 383. When the frame 51 is located at the upper position P9*c*, the protrusion 503 is slightly separated above the horizontal surface 313H. The roller 352 reaches the nip position P4*a*, and the platen main body 361 reaches the sheet support position P7*a*. The movable upper guide member 50 takes a conveyance position. The inner guide member 44 takes a conveyance position.

As shown in FIG. 3A, after the extending end portion of the release lever 53 moves to a position forward of the rear surface 313P of the protrusion 313F, the release lever 53 extends vertically downward from the shaft 531. At this time, the link rod 52 is stationary at a rearmost position P10*b* (an example of a second support position) in the movable range in the front-rear direction. The supply tray 31 continues to move farther rearward to reach the mount position P2. In this process, the cam follower 335, which has been relatively moving on the horizontal surface 313H, fits into the concave portion 313E (see FIG. 3B). As a result, the feed arm 332 rotationally moves downward in the circumferential direction of the feed shaft 331, and the feed roller 333 moves downward and contacts the sheet 1 from above. Further, the movable lower guide member 49 rotationally moves downward in the circumferential direction of the shaft 491 together with the rotational movement of the feed arm 332, and takes a conveyance position. Even after the supply tray 31 reaches the mount position P2, the frame 51 remains supported by the link rod 52, whereby the rollers 352 are positioned at the nip position P4*a* and the platen main body 361 is positioned at the sheet support position P7*a*. The movable upper guide member 50 maintains the conveyance position. After that, the printer unit 30 is ready to record an image.

[Operation in Drawing Process of Supply Tray 31]

The operation of the printer unit 30 in the drawing process of the supply tray 31 will be described with reference to FIGS. 3A, 3B, 4A, 4B, and 11A to 14.

In the printer unit 30, a jam (that is, the sheet 1 is clogged in the first conveyance path 34) occurs in the first conveyance path 34 during image recording. When a jam occurs, the printer unit 30 stops image recording and displays a message on a display to warn the user that a jam has occurred. After confirming the message, the user starts to pull out the supply tray 31.

As shown in FIG. 13B, the supply tray 31 starts to be pulled out from the mount position P2 and moves forward in the internal space 22. In the drawing process, the cam follower 335 exits the concave portion 313E and starts to move on the horizontal surface 313H relative to the horizontal surface 313H. As a result, the feed arm 332 rotationally move upward in the circumferential direction of the feed shaft 331, and the movable lower guide member 49 rotationally moves upward in the circumferential direction of the shaft 491. That is, the movable lower guide member 49 moves upward from the non-conveyance position. During this time, the protrusion 503 moves on the horizontal surface 313H relative to the horizontal surface 313H. After that, the front surface 313Q of the protrusion 313F of the supply tray 31 contacts the release lever 53 from the rear side.

Figure 14:
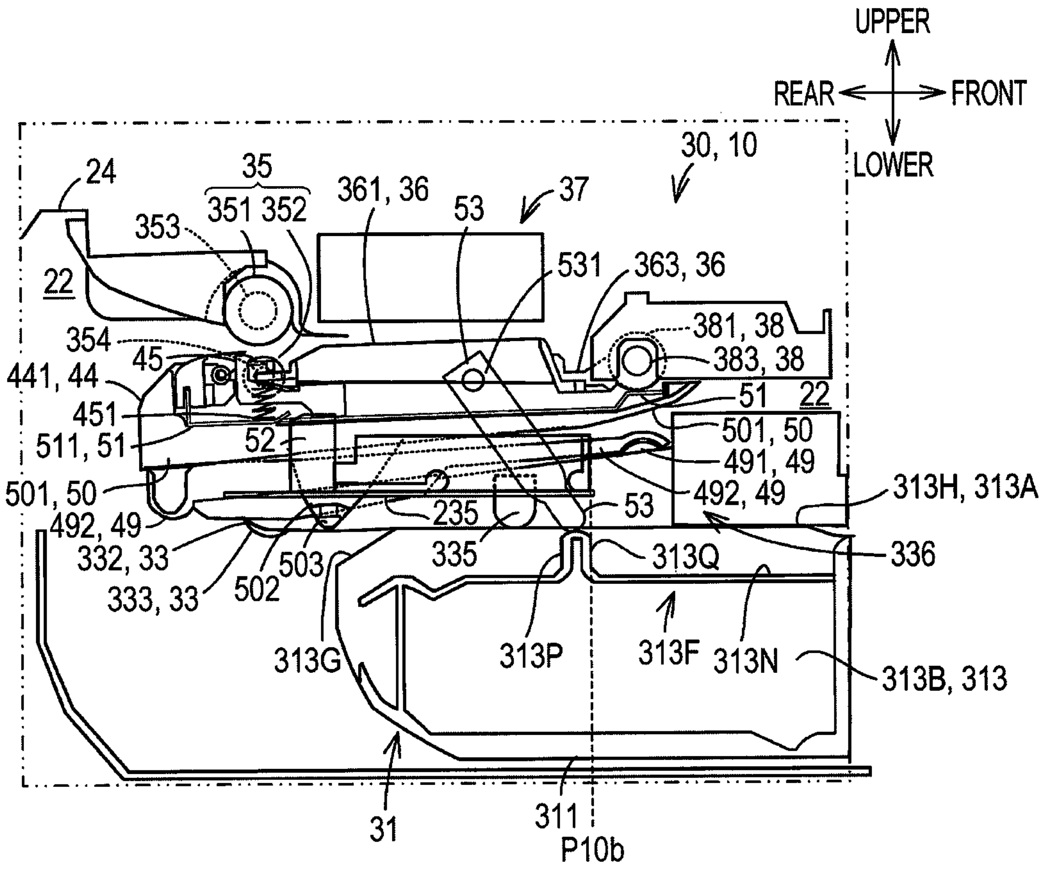
FIG. 14 is a schematic view showing a state of the printer unit 30 in the mounting process and the drawing process of the supply tray 31, and showing a state where the release lever 53 is in contact with a front surface 313Q.

As shown in FIG. 14, while the release lever 53 contacts the front surface 313Q and then moves over the protruding portion 313R (see FIG. 3B) toward the rear surface 313P, the release lever 53 receives a forward force from the protrusion 313F, moves upward and forward in the circumferential direction of the shaft 531, and applies the forward force to the second contact surface 524 of the link rod 52, that is, presses the second contact surface 524 forward. As a result, the link rod 52 starts to move forward from the front-rear position P10*b*. After that, the horizontal surface 525B moves forward directly below the second portion 511B of the protruding piece 511, and the inclined surface 525A moves forward directly below the first portion 511A. As a result, the link rod 52 reaches the front-rear position P10*a*. During this time, the frame 51 moves from the upper position P9*c* to the intermediate position P9*b* in the circumferential direction of the shaft 383, and the protrusion 503 falls on the horizontal surface 313H of the supply tray 31 from the state of being separated from the horizontal surface 313H and contacts the horizontal surface 313H. When the frame 51 is located at the intermediate position P9*b*, the roller 352 is separated downward from the nip position P4*a*, and the platen main body 361 is separated downward from the sheet support position P7*a*. The movable upper guide member 50 and the inner guide member 44 do not take the conveyance position.

As shown in FIG. 14, even after the frame 51 moves from the upper position P9*c* to the intermediate position P9*b*, the cam follower 335 moves on the horizontal surface 313H relative to the horizontal surface 313H. In this process, when the cam follower 335 reaches a position rearward of the horizontal surface 313H, the frame 51 rotationally moves downward in the circumferential direction of the shaft 383 and is supported by the feed arm 332 via the movable lower guide member 49.

As shown in FIG. 11B, when the supply tray 31 moves farther forward, the cam follower 335 starts to move on the inclined surface 313G relative to the inclined surface 313G, and the feed arm 332 rotationally moves farther downward in the circumferential direction of the feed shaft 331. As a result, the movable lower guide member 49 takes a position closer to the non-conveyance position. The frame 51 rotationally moves downward in the circumferential direction of the shaft 383 in conjunction with the rotational movement of the feed arm 332, and as a result, the movable upper guide member 50 and the inner guide member 44 take a position closer to the non-conveyance position.

As shown in FIGS. 4A and 11A, when the supply tray 31 is completely pulled out from the internal space 22 and the protrusion 503 and the cam follower 335 are separated from the inclined surface 313G, the feed arm 332 of the feed mechanism 33 stops at the lower position P8*a* in the circumferential direction of the feed shaft 331, and the movable lower guide member 49 takes a non-conveyance position. The frame 51 is stopped at the lower position P9*a* due to contact between the protrusion 452 and the stopper 234 (see FIG. 7). At this time, the platen main body 361 and the roller 352 are located at the separation positions P7*b* and P6*a*, respectively, and the movable upper guide member 50 and the inner guide member 44 take a non-conveyance position.

Here, an angle R1*a* is defined as the angle by which the movable upper guide member 50 rotates in the circumferential direction of the shaft 383 from the conveyance position (see FIG. 3A) to the non-conveyance position (see FIG. 4A). The angle R1*a* is also an angle by which the upper surface of the platen main body 361 rotates in the circumferential direction of the shaft 383 from the sheet support position P7*a* to the separation position P7*b*.

An angle R2*a* is defined as the angle by which the lower guide main body 492 of the movable lower guide member 49 rotates in the circumferential direction of the shaft 491 from the conveyance position (see FIG. 3A) to the non-conveyance position (see FIG. 4A). The angle R1*a* is smaller than the angle R2*a*. Due to the relationship between the angles R1*a* and R2*a*, the interval between the rear end of the movable upper guide member 50 and the rear end of the movable lower guide member 49 is wider when the movable upper guide member 50 is in the non-conveyance position than when the movable upper guide member 50 is in the conveyance position.

An angle θ1*a* is defined as the angle formed between the upper surface of the platen main body 361 at the sheet support position P7*a* (see FIG. 3A) and the upper surface of the platen main body 361 at the separation position P7*b* (see FIG. 4A). An angle θ2*a* is defined as the angle formed between the upper surface of the movable lower guide member 49 in the conveyance position (see FIG. 3A) and the upper surface of the movable lower guide member 49 in the non-conveyance position (see FIG. 4A). The angle θ1*a* is smaller than the angle θ2*a*.

After that, the user moves the cover 42 from the closed position P1*a* to the open position P1*b* (see FIG. 1B) to move the outer guide member 43 from the closed position P5*a* to the open position P5*b* (see FIG. 2). With this operation, as shown in FIG. 9, the rollers 351 at the nip position P4*a*, the rollers 352 at the separation position P6*a*, the platen 36, and the inner guide member 44 are exposed through the second opening 21B. The rear end of the movable upper guide member 50 in the non-conveyance position and the rear end of the movable lower guide member 49 in the non-conveyance position are also exposed through the second opening 21B. The user accesses the curved portion 341 of the first conveyance path 34 and removes the jammed sheet 1.

[Operations and Effects of Printer Unit 30]

In the printer unit 30, as the supply tray 31 is moved forward (that is, in the drawing direction), the space between the recording head 37 and the platen 36 widens compared with that when the supply tray 31 is at the mount position P2. Thus, the user can easily remove the sheet 1 jammed at the curved portion 341 of the first conveyance path 34, through the second opening 21B. That is, jam removing becomes easy. Further, as the supply tray 31 is moved forward, all of the rear end of the platen 36, the rear end of the movable upper guide member 50, and the rear of the movable lower guide member 49 move downward and are accessible through the second opening 21B. Thus, the height of the printer unit 30 can be reduced as compared with the case where at least one of the rear end of the movable upper guide member 50 and the rear end of the movable lower guide member 49 is immovable.

In the printer unit 30, as the supply tray 31 is moved forward, the roller 352 moves from the nip position P4*a* to the separation position P6*a*. That is, the roller 352 separates from the roller 351. This further makes jam clearing easier.

In the printer unit 30, since the roller 352 is attached to the rear end of the platen 36, the roller 352 moves together with the platen 36. That is, the printer unit 30 need not be provided with an individual movement mechanism for each of the roller 352 and the platen 36.

In the printer unit 30, the frame 51 supports the roller 352 and the platen 36 at the upper surface side, and supports the movable upper guide member 50 at the lower surface side. With this configuration, the roller 352, the platen 36, and the movable upper guide member 50 can be moved together.

In the printer unit 30, the shaft 383 is located downstream of the platen 36 in the first conveyance path 34, and extends in the left-right direction (an example of a crossing direction). The frame 51 is rotatably supported by the shaft 383 via the left supported portion 362 and the right supported portion 363 of the platen 36. The roller 352, the platen 36, and the movable upper guide member 50 rotationally move in the circumferential direction of the shaft 383. With this configuration, the roller 352, the platen 36 and the movable upper guide member 50 can be moved in a small space as compared with a configuration where the roller 352, the platen 36 and the movable upper guide member 50 are moved up and down as a whole.

In the printer unit 30, the frame 51 is rotatably supported by the shaft 383 of the second roller pair 38. That is, the shaft 383 is shared by the frame 51 and the second roller pair 38. This reduces the number of components of the printer unit 30.

In the printer unit 30, the link rod 52 and the release lever 53 cause the frame 51 (that is, the roller 352, the platen 36, and the movable upper guide member 50) to move by effectively utilizing the gravity and the forward force generated by the movement of the supply tray 31. Thus, a motor that generates power to move the frame 51 is not needed.

In the printer unit 30, the coil spring 451 is interposed between the shaft 354 and the frame 51 to apply an upward urging force to the shaft 354. Thus, the roller 352 is in pressure contact with the roller 351.

In the printer unit 30, the roller 352 is attached to the frame 51. The roller 352 is a follow roller, and thus can be made lightweight and easily movable.

In the printer unit 30, the first conveyance path 34 is a so-called U-turn path. Thus, the printer unit 30 can be made low profile with no increase in installation area (footprint).

In the printer unit 30, the movable lower guide member 49 takes a conveyance position and a non-conveyance position in the process of relative movement of the cam surface (that is, the horizontal surface 313H and the concave portion 313E) and the earn follower 335. This eliminates the need for a motor that generates power to move the movable lower guide member 49.

In the printer unit 30, the frame 51 supports the inner guide member 44 at the upper surface side. The inner guide member 44 takes a conveyance position and a non-conveyance position according to the movement of the supply tray 31 in the front-rear direction. Thus, the user does not need to operate the inner guide member 44 individually, which facilitates jam clearing. Further, a motor that generates power for moving the inner guide member 44 is not required.

In the printer unit 30, the interval between the rear end of the movable upper guide member 50 and the rear end of the movable lower guide member 49 is wider when the movable upper guide member 50 is in the non-conveyance position than when the movable upper guide member 50 is in the conveyance position. This makes it easy to find the sheet 1 or a sheet piece stuck between the movable upper guide member 50 and the movable lower guide member 49.

In the printer unit 30, the angle $\theta 1a$ is smaller than the angle $\theta 2a$. Thus, the user can easily find the sheet 1 or a sheet piece that is clogged on the movable lower guide member 49.

[Modification]

While the disclosure has been described in detail with reference to the above aspects thereof, it would be apparent to those skilled in the art that various changes and modifications may be made therein without departing from the scope of the claims.

In the embodiment, the first conveyance path 34 is a so-called U-turn path. Alternatively, the first conveyance path 34 may be a so-called S-shaped conveyance path.

In the embodiment, the roller 352, the platen 36, the inner guide member 44, and the movable upper guide member 50 are attached to the frame 51, and these components rotationally move up and down together in the circumferential direction of the shaft 383. Alternatively, the roller 352, the platen 36, the inner guide member 44, and the movable upper guide member 50 may simply move up and down.

Further, the platen 36, the inner guide member 44, and the movable upper guide member 50, excluding the roller 352, may rotationally move up and down together in the circumferential direction of the shaft 383.

In the embodiment, the roller 352, the platen 36, the inner guide member 44, and the movable upper guide member 50 rotationally move about the shaft 383 of the second roller pair 38. Alternatively, the roller 352, the platen 36, the inner guide member 44, and the movable upper guide member 50 may rotationally move about a shaft different from the shaft 383.

In the embodiment, the movable lower guide member 49 contacts the feed arm 332 from above and moves in an interlocking manner with the feed arm 332. Alternatively, the movable lower guide member 49 may rotationally move in the circumferential direction of the shaft 491 by a cam follower different from the cam follower 335.

The angle Ria may be the same as the angle $R2a$. The angle $\theta 1a$ may be the same as the angle $\theta 2a$.

In the embodiment, the printer unit 30 has the first conveyance path 34 and the second conveyance path 40 for recording an image on each side of a sheet 1. However, the printer unit 30 may not have the second conveyance path 40 and may record an image on only one side of a sheet 1.

What is claimed is:

1. An image recording apparatus comprising:
  a housing including a first surface having a first opening, a second surface having a second opening, and a first conveyance path;
  a cover provided at the second surface and being movable between a closed position at which the second opening is closed and an open position at which the second opening is opened;
  a tray configured to support a sheet and being movable through the first opening in a mounting direction toward a mount position in the housing and a drawing direction opposite the mounting direction;
  a roller pair located above the tray at the mount position, the roller pair including a lower roller and an upper roller located in contact with each other at the first conveyance path;
  a platen located downstream of the roller pair in the first conveyance path, the platen having an end facing the second surface;
  a recording head facing the platen from above and configured to eject ink to a sheet supported by the platen; and
  a movement mechanism configured to move the platen and the lower roller in conjunction with movement of the tray in the drawing direction such that:
    the end of the platen moves from a first support position at which the platen supports a sheet to a first lower position at which the platen is separated farther downward from the recording head than at the first support position; and
    the lower roller moves from a contact position at which the lower roller contacts the upper roller to a second lower position at which the lower roller is separated downward from the upper roller.

2. The image recording apparatus according to claim 1, wherein the lower roller is attached to the end of the platen.

3. The image recording apparatus according to claim 2, wherein the movement mechanism includes a frame configured to support the lower roller and the platen.

4. The image recording apparatus according to claim 3, further comprising a first shaft located downstream of the platen in the first conveyance path and extending in a crossing direction crossing the first conveyance path,
  wherein the frame is rotatably supported by the first shaft.

5. The image recording apparatus according to claim 4, further comprising a third roller attached to the first shaft and configured to convey the sheet in the first conveyance path.

6. The image recording apparatus according to claim 3, further comprising:

a third shaft extending in the crossing direction, the lower roller being attached to the third shaft;

a holder configured to support the third shaft such that the lower roller is rotatable, the holder being supported by the frame; and an urging member provided between the third shaft and the frame and configured to urge the third shaft.

7. The image recording apparatus according to claim 1, wherein the lower roller is configured to rotate by following rotation of the upper roller.

8. The image recording apparatus according to claim 1, wherein the first conveyance path extends upward from the tray at the mount position while curving to extend in the drawing direction.

9. The image recording apparatus according to claim 1, further comprising:

an upper guide member configured to, in conjunction with movement of the tray in the drawing direction, move from a first conveyance position to a first non-conveyance position, the first conveyance position being a position in which the upper guide member defines a second conveyance path for guiding the sheet from a downstream position downstream of the platen in the first conveyance path to an upstream position upstream of the platen in the first conveyance path, the second conveyance path being located below the platen, and the first non-conveyance position being a position in which an end of the upper guide member facing the second surface is separated farther downward from the recording head than in the first conveyance position; and a lower guide member configured to, in conjunction with movement of the tray in the drawing direction, move from a second conveyance position to a second non-conveyance position, the second conveyance position being a position in which the lower guide member defines the second conveyance path together with the upper guide member at a position below the upper guide member; and the second non-conveyance position being a position in which an end of the lower guide member facing the second surface is separated farther downward from the recording head than in the second conveyance position.

10. The image recording apparatus according to claim 9, wherein the tray includes:

a support surface configured to support the sheet;

a side wall extending upward from the support surface; and a protruding portion protruding in the crossing direction from the side wall;

wherein the movement mechanism includes:

a guide member provided at the housing and located above the tray at the mount position;

a second shaft provided at the housing and extending in the crossing direction above the guide member;

a link rod supported by the guide member so as to be movable between: a second support position at which the link rod supports the frame to position the platen at the first support position; and a non-support position at which the link rod is closer to the first surface than at the second support position and at which the link rod does not support the frame, the link rod having a first contact portion and a second contact portion arranged with a space therebetween in the mounting direction at positions lower than the second shaft; and a release lever having a base end rotatably supported by the second shaft and an extending end located at a lower position than the protruding portion, the release lever extending from the base end to the extending end through the space of the link rod, the release lever being located closer to the first surface than the protruding portion when the tray is located at the mount position, wherein the release lever is configured to rotationally move about the second shaft due to contact with the protruding portion when the tray moves in the drawing direction, and to press the second contact portion in the drawing direction, wherein the link rod is configured to move in the drawing direction due to pressing by the release lever and to move from the second support position to the non-support position, and wherein, in response to movement of the link rod to the non-support position, the end of the platen, the end of the upper guide member, and the lower roller are configured to move to the first lower position, the first non-conveyance position, and the second lower position.

11. The image recording apparatus according to claim 10, wherein the housing includes a stopper configured to stop the platen at the first lower position.

12. The image recording apparatus according to claim 10, wherein the movement mechanism includes:

a cam surface provided at the side wall and extending along the drawing direction; and a cam follower configured to, in conjunction with movement of the tray in the drawing direction, move from a contact position at which the cam follower contacts the cam surface to a lower position at which the cam follower separates from the cam surface, the lower position being lower than the contact position, and wherein the lower guide member is configured to move between the second conveyance position and the second non-conveyance position while the cam follower moves between the contact position and lower position.

13. The image recording apparatus according to claim 9, further comprising:

an inner guide member configured to, in conjunction with movement of the tray in the drawing direction, move from a third conveyance position to a third non-conveyance position, the third conveyance position being a position in which the inner guide member defines the first conveyance path at a position closer to the second surface than the platen, the upper guide member, and the lower guide member, the third non-conveyance position being a position in which the inner guide member is located at a lower position than in the third conveyance position and the end of the platen, the end of the upper guide member, and the end of the lower guide member are accessible through the second opening; and an outer guide member configured to move between:

a fourth conveyance position in which the outer guide member defines the first conveyance path together with the inner guide member when the cover is located at the closed position; and a fourth non-conveyance position in which the outer guide member opens the second opening when the cover is located at the open position.

14. The image recording apparatus according to claim 9, wherein an interval between the end of the upper guide member and the end of the lower guide member is wider when the upper guide member is in the first non-conveyance position than when in the first conveyance position.

15. The image recording apparatus according to claim 9, wherein the platen has a first surface configured to support the sheet, wherein the lower guide member has a second surface configured to define the second conveyance path, and wherein an angle formed between the first surface of the platen at the first support position and the first surface of the platen at the first lower position is smaller than an angle formed between the second surface of the lower guide member in the second conveyance position and the second surface of the lower guide member in the second non-conveyance position.

16. The image recording apparatus according to claim 1, wherein the first conveyance path has a curved portion that extends upward from the tray at the mount position while curving to reach a nip position of the roller pair, and a straight portion that is continuous with a downstream end of the curved portion and extends linearly from the downstream end of the curved portion in a conveyance direction of the sheet, and wherein, when the cover is located at the open position, the curved portion is exposed to outside the housing through the second opening.

17. The image recording apparatus according to claim 1, wherein the end of the platen and the lower roller are accessible from outside the housing through the second opening in a state where the platen is located at the first lower position, the lower roller is located at the second lower position, and the cover is located at the open position.

* * * * *